United States Patent
Li

(10) Patent No.: US 10,838,829 B2
(45) Date of Patent: Nov. 17, 2020

(54) METHOD AND APPARATUS FOR LOADING DATA FROM A MIRROR SERVER AND A NON-TRANSITORY COMPUTER READABLE STORAGE MEDIUM

(71) Applicant: Huawei Technologies Co., Ltd., Shenzhen (CN)

(72) Inventor: Mingjun Li, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 4 days.

(21) Appl. No.: 16/238,093

(22) Filed: Jan. 2, 2019

(65) Prior Publication Data
US 2019/0138405 A1    May 9, 2019

Related U.S. Application Data

(63) Continuation of application No. PCT/CN2017/104581, filed on Sep. 29, 2017.

(51) Int. Cl.
*G06F 11/14* (2006.01)
*G06F 11/20* (2006.01)
(Continued)

(52) U.S. Cl.
CPC .......... *G06F 11/1469* (2013.01); *G06F 8/63* (2013.01); *G06F 9/45558* (2013.01);
(Continued)

(58) Field of Classification Search
CPC .... G06F 11/1469; G06F 8/63; G06F 11/2056; G06F 11/073; G06F 9/45558;
(Continued)

(56) References Cited

U.S. PATENT DOCUMENTS 8,286,030 B1 * 10/2012 Chatterjee ........... G06F 11/1662
714/20
2009/0210781 A1   8/2009 Hagerott et al.
(Continued)

FOREIGN PATENT DOCUMENTS

CN    102331949 A    1/2012
CN    103299311 A    9/2013
(Continued)

OTHER PUBLICATIONS

Machine Translation and Abstract of Chinese Publication No. CN105068856, Nov. 18, 2015, 9 pages.
(Continued)

*Primary Examiner* — Hong C Kim
(74) *Attorney, Agent, or Firm* — Conley Rose, P.C.

(57) ABSTRACT

A data loading method and device, where the method includes obtaining a data loading request of a virtual machine after the virtual machine is started, the data loading requesting to load target data in an image file, determining whether the target data is stored in a volume and a snapshot corresponding to the virtual machine, where the snapshot is obtained based on a blank volume corresponding to the virtual machine when the virtual machine is created, writing the target data from a mirror server into the snapshot when the target data is not stored in the volume or the snapshot, reading the target data and transferring the target data to the virtual machine, obtaining virtual machine data generated by the virtual machine, and writing the virtual machine data into the volume. Hence, a conflict between new data and old data in a data loading process is resolved.

20 Claims, 13 Drawing Sheets

(51) Int. Cl.
*G06F 11/07* (2006.01)
*G06F 9/455* (2018.01)
*G06F 8/61* (2018.01)

(52) U.S. Cl.
CPC ........ *G06F 11/073* (2013.01); *G06F 11/2056* (2013.01); *G06F 2009/45575* (2013.01); *G06F 2009/45579* (2013.01); *G06F 2201/84* (2013.01)

(58) Field of Classification Search
CPC . G06F 2009/45579; G06F 2009/45575; G06F 2201/84; G06F 2201/815; G06F 11/1451
USPC .......................................... 707/640; 711/162
See application file for complete search history.

(56) References Cited

U.S. PATENT DOCUMENTS

| | | |
|---|---|---|
| 2012/0066677 A1 | 3/2012 | Tang |
| 2014/0025939 A1 | 1/2014 | Smith et al. |
| 2014/0223126 A1 | 8/2014 | Ye |
| 2015/0154227 A1 | 6/2015 | Wang et al. |
| 2015/0242283 A1 | 8/2015 | Simoncelli et al. |
| 2016/0063014 A1 | 3/2016 | Chelur et al. |
| 2016/0216896 A1* | 7/2016 | Sivasubramanian ........................ G06F 11/1456 |

FOREIGN PATENT DOCUMENTS

| | | | |
|---|---|---|---|
| CN | 103389884 A | 11/2013 | |
| CN | 103914647 A | 7/2014 | |
| CN | 104461785 A | 3/2015 | |
| CN | 104866435 A | 8/2015 | |
| CN | 105068856 A | 11/2015 | |
| CN | 105094948 A | 11/2015 | |
| CN | 105739918 A | 7/2016 | |
| CN | 107092538 A | 8/2017 | |
| EP | 2755132 A1 | 7/2014 | |
| EP | 3502877 A1 * | 6/2019 | .......... G06F 11/1451 |

OTHER PUBLICATIONS

Machine Translation and Abstract of Chinese Publication No. CN105094948, Nov. 25, 2015, 22 pages.
Machine Translation and Abstract of Chinese Publication No. CN105739918, Jul. 6, 2016, 20 pages.
Machine Translation and Abstract of Chinese Publication No. CN107092538, Aug. 25, 2017, 15 pages.
Nicolae, B., et al., "Going Back and Perth: Efficient Virtual Machine Image Deployment and Snapshotting on IaaS Clouds," Oct. 2010, 30 pages.
Razavi, K., et al., "Squirrel: Scatter Hoarding VM Image Contents on Iaa5 Compute Nodes," Jun. 23, 2014, 14 pages.
Foreign Communication From a Counterpart Application, European Application No. 17916458.7, Extended European Search Report dated Feb. 11, 2020, 11 pages.

* cited by examiner

METHOD AND APPARATUS FOR LOADING DATA FROM A MIRROR SERVER AND A NON-TRANSITORY COMPUTER READABLE STORAGE MEDIUM

CROSS-REFERENCE TO RELATED APPLICATION

This application is a continuation of International Patent Application No. PCT/CN2017/104581 filed on Sep. 29, 2017, which is hereby incorporated by reference in its entirety.

TECHNICAL FIELD

This application relates to the computer field, and in particular, to a data loading method and apparatus.

BACKGROUND

A virtualization technology is an important technology in a cloud computing system. The virtualization technology can expand a hardware capacity and simplify a software reconfiguration process. Virtualization of a central processing unit (CPU), a memory, a network, and the like using the virtualization technology can allow a plurality of virtual machines to run simultaneously in one cloud computing system, and the virtual machines can run independently without affecting each other. In addition, to improve virtual machine creation efficiency, an image file is stored in the cloud computing system. The image file is an optical disc image file required for virtual machine creation, and a new virtual machine can be created by copying the image file.

The cloud computing system usually includes the following several modules a cloud platform, a cloud host, cloud storage, and a mirror server. The cloud platform is a platform for man-machine interaction between an administrator and the cloud computing system. A virtual machine management program runs on the cloud platform, the virtual machine management program may be a web client, and the virtual machine management program is used to trigger the cloud host to perform operations such as creation, starting, and deletion of a virtual machine. At least one volume management program and image management program run in the cloud host. When there are a plurality of volume management programs, the plurality of volume management programs include a primary volume management program. The primary volume management program is used to create a corresponding volume in the cloud storage for a virtual machine, obtain an image file from the mirror server using the image management program, and write the image file into the volume. The primary volume management program is further used to assign a data loading task to another volume management program. The cloud storage includes a volume managed by each volume management program, and each volume management program is responsible for managing at least one volume. At least one image file is stored in the mirror server.

Because the image file has a relatively large data amount, a related technology provides a lazy loading (Lazyload) technology to implement fast virtual machine creation. When the administrator uses the virtual machine management program to trigger the cloud host to create a virtual machine, the cloud host first creates, in the cloud storage using the volume management program, a blank lazy loading volume corresponding to the virtual machine, mounts the lazy loading volume to the cloud host, and then creates an association relationship between the blank volume and an image file using the image management program. In this case, this lazy loading volume can be mounted to the virtual machine in the cloud host for normal use, without loading all data in the image file to the lazy loading volume. When needing to load target data in the image file, the virtual machine first queries, using the volume management program, whether the target data is stored in the lazy loading volume. If the target data is stored in the lazy loading volume, the target data is read from the lazy loading volume and is transferred to the virtual machine, or if the target data is not stored in the lazy loading volume, the volume management program reads, using the image management program, the target data from the mirror server to the lazy loading volume based on the association relationship, and transfers the target data in the lazy loading volume to the virtual machine. After obtaining the target data that the virtual machine requests to load, the virtual machine performs an input/output (I/O) operation based on the target data to obtain virtual machine data, and writes the virtual machine data into the lazy loading volume using the volume management program.

The virtual machine loads the target data in the image file as required, and another volume management program also loads an image file in the background to the lazy loading volume based on a data sequence. After all data in the image file is loaded to the lazy loading volume, the lazy loading volume is converted into a normal volume, and the association relationship between the lazy loading volume and the image file is deleted. However, when the image file is being loaded in the background, if the virtual machine data generated by the virtual machine needs to be written into a storage location A of the lazy loading volume, and the image file loaded in the background also needs to be written into the storage location A of the lazy loading volume, a data writing conflict occurs, causing a data error.

SUMMARY

This application provides a data loading method and apparatus in order to resolve a data conflict occurring in a data loading process. The technical solutions are as follows.

According to a first aspect, a data loading method is provided. The method includes obtaining a data loading request of the virtual machine after a virtual machine is started, determining whether target data indicated by the data loading request is stored in a snapshot corresponding to the virtual machine, when the target data is not stored in the snapshot, writing the target data from a mirror server into the snapshot, and then reading the target data and transferring the target data to the virtual machine, and then obtaining virtual machine data generated by the virtual machine, and writing the virtual machine data into a volume. The data loading request is used to request to load the target data in an image file, the snapshot is obtained based on a blank volume corresponding to the virtual machine when the virtual machine is created, the volume is associated with a corresponding snapshot, the snapshot is used to lazily load the image file, and the snapshot is associated with the image file.

The snapshot corresponding to the volume is created, the data loaded from the mirror server is written into the snapshot in a data loading process, and the virtual machine data generated by the virtual machine is written into the volume. In this way, the following problem can be resolved. After the virtual machine data generated by the virtual machine is written into the volume, the target data loaded from the mirror server overwrites the virtual machine data, causing a conflict between new data and old data. Because the virtual machine data and the target data are separately written into different locations, the conflict between the new data and the old data does not occur, and a probability of a data loading error of the virtual machine can be reduced.

With reference to the first aspect, in a first implementation of the first aspect, the method further includes loading data in the image file except the target data to the snapshot, and after all data in the image file is loaded to the snapshot, switching an attribute of the snapshot from a lazy loading attribute to a normal attribute.

Data that the virtual machine does not request to load in the image file is loaded to the snapshot in the background such that the data can be written into the snapshot before the virtual machine requests to load the data. In this way, the data in the snapshot can be directly sent to the virtual machine when the virtual machine subsequently requests the data, thereby increasing a data loading speed of the virtual machine.

In addition, if a volume management program does not change the attribute of the snapshot after all the data in the image file is loaded to the snapshot, a volume management program that loads data from the mirror server in the background may continuously detect whether there is unloaded data in the snapshot, wasting resources for loading data in the background. Therefore, the attribute of the snapshot is switched from the lazy loading attribute to the normal attribute when all the data in the image file is loaded to the snapshot such that the volume management program can be notified that whether there is unloaded data in the snapshot no longer needs to be detected, thereby saving resources for loading data in the background.

With reference to the first implementation of the first aspect, in a second implementation of the first aspect, after loading data in the image file except the target data to the snapshot, the method further includes combining the data in the snapshot, and storing the data into the volume.

Optionally, after loading data in the image file except the target data to the snapshot, the method further includes deleting the snapshot.

With reference to the first aspect or any one of the implementations of the first aspect, in a third implementation of the first aspect, writing the target data from a mirror server into the snapshot includes writing the target data from the mirror server into a cache volume corresponding to the image file, and writing the target data in the cache volume into the snapshot.

The cache volume is created such that each volume management program first searches for the target data in the cache volume before loading the target data from the mirror server. In this way, data corresponding to each storage location in the cache volume needs to be loaded only once from the mirror server, and the mirror server does not need to process data in a same storage location a plurality of times, thereby reducing image data processing pressure on the mirror server.

With reference to the third implementation of the first aspect, in a fourth implementation of the first aspect, writing the target data from the mirror server into a cache volume corresponding to the image file includes writing the target data from the mirror server into the cache volume when the virtual machine is the first virtual machine that requests to load the target data.

With reference to the third implementation of the first aspect, in a fifth implementation of the first aspect, before writing the target data in the cache volume into the snapshot, the method further includes, when the virtual machine is not the first virtual machine that requests to load the target data, and another virtual machine is requesting to write the target data into the cache volume, suspending responding to the data loading request until the target data is written into the cache volume.

With reference to any one of the third implementation to the fifth implementation of the first aspect, in a sixth implementation of the first aspect, the cache volume is a snapshot corresponding to an already created virtual machine, and the already created virtual machine includes a virtual machine that sends the data loading request, and after writing the target data from a mirror server into the snapshot, the method further includes, when all the data in the image file has been loaded to the cache volume, and all the data in the image file has been loaded to a snapshot corresponding to another virtual machine that uses the image file, combining the data in the cache volume, and storing the data into a volume corresponding to the already created virtual machine.

Optionally, when all the data in the image file has been loaded to the cache volume, and all the data in the image file has been loaded to the snapshot corresponding to the other virtual machine that uses the image file, the cache volume is deleted.

The snapshot of the already created virtual machine is set as the cache volume, and there is no need to additionally create a cache volume in cloud storage. In this way, the cache volume does not need to additionally occupy a storage resource in the cloud storage, thereby saving storage resources in the cloud storage.

In addition, when all the data in the image file has been loaded to the cache volume, and all the data in the image file has been loaded to the snapshot corresponding to the other virtual machine that uses the image file, the data in the cache volume is combined and stored into the volume corresponding to the already created virtual machine, thereby ensuring that a snapshot associated with the cache volume can still load data from the cache volume when all the data in the image file has been loaded to the cache volume, and ensuring validity of the cache volume.

With reference to any one of the first aspect to the second implementation of the first aspect, in an eighth implementation of the first aspect, after obtaining virtual machine data generated by the virtual machine, and writing the virtual machine data into a volume, the method further includes sending the data stored in the volume to a backup storage system, where the backup storage system is configured to use the data stored in the volume as incremental backup data of the virtual machine, use an image file stored in the mirror server as full backup data of the virtual machine, and perform data recovery for the virtual machine based on the full backup data and the incremental backup data.

The data in the volume is used as the incremental backup data, and the image file in the mirror server is used as the full backup data. Because the backup storage system and the image file use a same storage system, only the data in the volume needs to be backed up when the volume management program performs a backup for the first time, thereby reducing an amount of data that needs to be backed up by the volume management program.

According to a second aspect, a data loading apparatus is provided. The apparatus has a function of implementing the data loading method according to the first aspect or any one of the implementations of the first aspect. The function may be implemented by hardware, or may be implemented by executing corresponding software by hardware. The hardware or software includes one or more units corresponding to the foregoing function.

According to a third aspect, a data loading device is provided. The device includes a processor and a memory that is connected to the processor. The processor executes an instruction that is stored in the memory to implement the data loading method according to the first aspect or any one of the implementations of the first aspect.

According to a fourth aspect, a computer readable storage medium is provided. An instruction is stored in the computer readable storage medium, and when the instruction is run on a data loading device, the data loading device performs the data loading method according to the first aspect or any one of the implementations of the first aspect.

DESCRIPTION OF EMBODIMENTS

"First", "second", and the like mentioned in this specification do not indicate any sequence, quantity, or importance, and are merely used to differentiate between components unless otherwise noted. Likewise, "a/an", "one", or the like is not intended to indicate a quantity limitation either, but is intended to indicate existence of at least one. "Connection", "link", or the like is not limited to a physical or mechanical connection, but may include an electrical connection, whether directly or indirectly.

"Unit" mentioned in this specification is usually a functional structure that is divided based on logic, and the "unit" may be implemented only by hardware, or implemented by a combination of hardware and software.

In this specification, "a plurality of" refers to two or more than two. The term "and/or" describes an association relationship for describing associated objects and represents that three relationships may exist. For example, A and/or B may represent the following three cases, only A exists, both A and B exist, and only B exists. The character "/" generally indicates an "or" relationship between the associated objects.

First, several terms related to this application are described.

A virtual machine (also referred to as VM) is a computer system simulated using software. The virtual machine has a complete hardware system function and runs in an operating environment that is isolated from an actual operating system.

The virtual machine is generated based on an image file of the actual operating system, and has the same function as the actual operating system. When the virtual machine is used, all operations are performed in a brand-new, independent, and virtual operating system. In addition, the virtual machine, in which software may be installed and data may be stored, has a desktop corresponding to the virtual machine, and does not affect the actual operating system.

A volume is a storage resource used for a virtual machine to access data.

Optionally, the volume in this application is a logical volume. The logical volume is a set of a plurality of logical partitions. The logical partitions in the logical volume are consecutive. However, physical partitions corresponding to two consecutive logical partitions may be inconsecutive. For example, physical partitions corresponding to two consecutive logical partitions are on different disks.

A logical partition is a logical unit that is mapped to a physical partition. One logical partition may correspond to one or more physical partitions.

A physical partition is obtained by dividing a physical volume into consecutive storage units of a same size.

A physical volume is a storage device configured to store data, and includes a removable storage device and an irremovable storage device, for example, a hard disk.

The following describes an example implementation environment in this application.

Figure 1A:
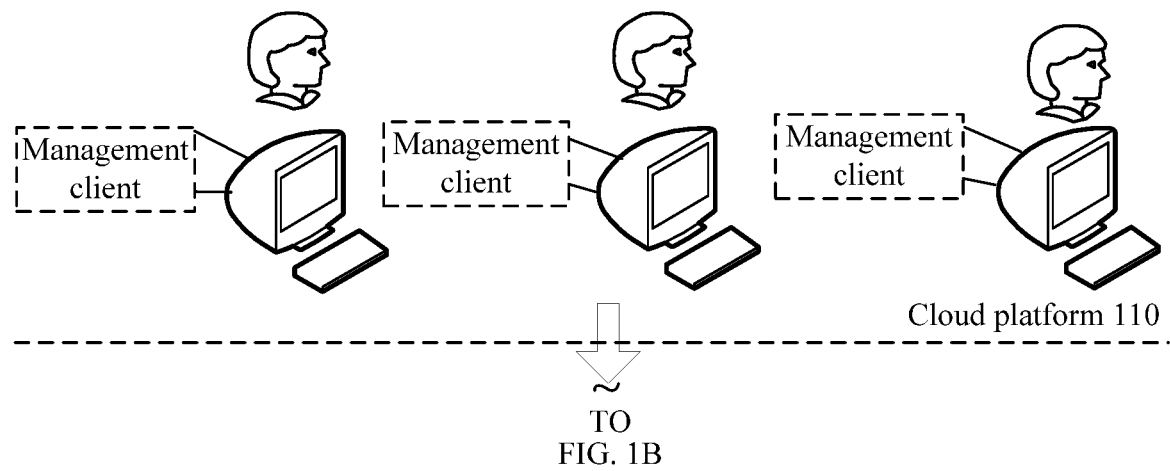
FIG. 1A and FIG. 1B are a schematic structural diagram of a data loading system according to an example embodiment of this application.
Figure 1B:
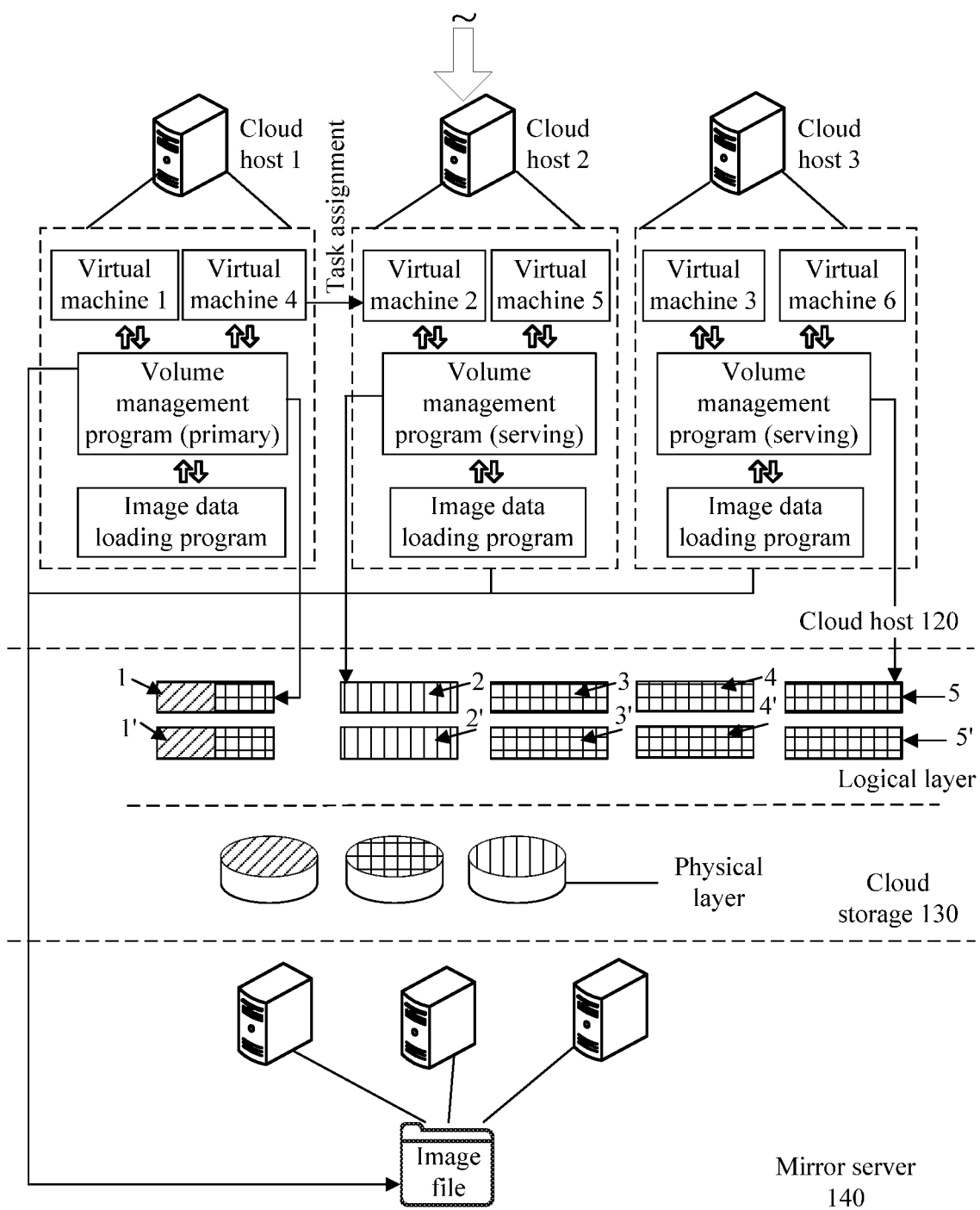

Referring to FIG. 1A and FIG. 1B, FIG. 1A and FIG. 1B are a schematic structural diagram of a data loading system according to an example embodiment of this application. The data loading system includes a cloud platform 110, at least one cloud host 120, cloud storage 130, and a mirror server 140.

The cloud platform 110 is configured to manage a virtual machine in the cloud host 120. Optionally, a management client runs in the cloud platform 110, and the management client is used for a user to manage the virtual machine in the cloud host 120.

Optionally, managing the virtual machine in the cloud host 120 by the cloud platform 110 includes but is not limited to creating a virtual machine in the cloud host 120, starting a virtual machine in the cloud host 120, and deleting a virtual machine in the cloud host 120.

The cloud platform 110 is connected to the cloud host 120 in a wired or wireless manner. For example, the cloud platform 110 is connected to the cloud host 120 through the Internet.

For example, the user sends a virtual machine creation request to the cloud host 120 using the cloud platform 110 in order to create a virtual machine in the cloud host 120, and after receiving the virtual machine creation request, the cloud host 120 creates the virtual machine based on creation information carried in the virtual machine creation request.

The creation information includes but is not limited to at least one of a computing resource, a storage resource, and a network resource required when the virtual machine runs.

The cloud host 120 is configured to run the virtual machine and manage resources required when the virtual machine runs. For example, the cloud host 120 manages a CPU (which corresponds to the computing resource), a memory (which corresponds to the storage resource), a network (which corresponds to the network resource), and the like.

Optionally, each cloud host 120 can run at least one virtual machine.

Optionally, the cloud host 120 is a server host, and at least one cloud host 120 forms a server cluster.

One or more volume management programs (for example, in FIG. 1A and FIG. 1B, one volume management program runs in a cloud host) run in each cloud host 120. The volume management program is used to create a volume in the cloud storage 130, write an image file in the mirror server 140 into the volume based on a data loading request, and access data in the volume.

Optionally, when the virtual machine is created, the volume management program creates, in the cloud storage 130, a blank volume corresponding to the virtual machine. Optionally, each volume management program correspondingly manages at least one volume.

Optionally, when the cloud host 120 has not yet created the virtual machine, at least one volume management program in the cloud host 120 does not manage a volume.

Optionally, each virtual machine managed by each volume management program corresponds to one volume. For example, in FIG. 1A and FIG. 1B, in a cloud host 2, a virtual machine 2 corresponds to a volume 2, a virtual machine 5 corresponds to a volume 3, and the volume 2 and the volume 3 are volumes managed by a service management program in the cloud host 2, and in a cloud host 3, a virtual machine 3 corresponds to a volume 4, a virtual machine 6 in the cloud host corresponds to a volume 5, and the volume 4 and the volume 5 are volumes managed by a service management program in the cloud host 3.

However, in some embodiments, a plurality of virtual machines may share a same volume. For example, in FIG. 1A and FIG. 1B, in a cloud host 1, a virtual machine 1 and a virtual machine 4 share a volume 1 in the cloud storage 130, and the volume 1 is a volume managed by a primary management program.

Optionally, the volume management program may also be referred to as a virtual block system (VBS).

Before the virtual machine in the cloud host 120 is started, the volume management program needs to mount the volume corresponding to the virtual machine to the cloud host 120.

Optionally, mounting the volume to the cloud host 120 is mounting the volume to a specific directory in the cloud host 120 as a partition of the cloud host 120.

Optionally, when different virtual machines share a same volume in the cloud storage, the volume management program needs to mount the volume to a specific directory corresponding to each virtual machine. Different virtual machines correspond to different specific directories.

Optionally, when there is a plurality of volume management programs, the volume management programs include the primary management program and the service management program.

The primary management program is used to create a blank volume corresponding to each virtual machine.

The service management program is used to process a data loading request of a managed virtual machine. For example, in FIG. 1A and FIG. 1B, a service management program 1 processes data loading requests of the virtual machine 1 and the virtual machine 2 in the cloud host 1.

Optionally, the primary management program is further used to process a data loading request of a virtual machine managed by the primary management program itself.

Optionally, the primary management program is further used to assign a background data loading task to the service management program, where the background data loading task is a task in which the service management program automatically loads data in the mirror server 140 in the background. For example, the primary management program assigns, to the service management program, a task of loading the data in the mirror server 140 in the background to a snapshot 2.

The data loading request is used to request the volume management program to load data in a corresponding storage location from a corresponding volume. Optionally, the data loading request carries a storage location in the volume that is of data (target data) that the virtual machine requests to load.

Optionally, the cloud host 120 is connected to the cloud storage 130 in a wired or wireless manner. For example, the cloud host 120 is connected to the cloud storage 130 through a local area network.

The cloud storage 130 includes at least one object storage device (OSD), and a volume and a snapshot store data in a logical form in at least one OSD.

At least one image file is stored in the mirror server 140, and image data is stored in the image file. The image data is used to support running of the virtual machine. Alternatively, each image file is used to create one type of virtual machine.

Optionally, the mirror server 140 is connected to the cloud host 120 in a wired or wireless manner. For example, the mirror server 140 is connected to the cloud host 120 through a local area network.

When a virtual machine has been created, the virtual machine corresponds to a blank volume. To ensure that the virtual machine can read to-be-loaded data from the volume using the volume management program, the image data in the image file in the mirror server 140 needs to be loaded to the volume.

Because the volume management program cannot directly load the image data from the mirror server 140, an image data loading program further runs in the cloud host 120, and the volume management program loads the image data from the mirror server 140 using the image data loading program.

Optionally, at least one image data loading program runs in each cloud host. The image data loading program is used to receive the data loading request of the volume management program and obtain the image data from the mirror server.

Optionally, the image data loading program is also referred to as a data gateway (DGW) service.

Optionally, in this application, a volume created by the volume management program has a lazy loading attribute. The lazy loading attribute is an attribute of loading data from the mirror server based on the data loading request of the virtual machine after the virtual machine has been created.

The lazy loading attribute is opposite to a full loading attribute. The full loading attribute is an attribute of loading full data required for running of the virtual machine from the mirror server to the volume before the virtual machine is started.

Optionally, in this application, after creating the blank volume corresponding to the virtual machine, the volume management program may further perform a snapshot operation on the blank volume to obtain a snapshot corresponding to the volume. The volume is associated with the snapshot. For example, in FIG. 1A and FIG. 1B, a snapshot 1' is obtained by performing a snapshot operation on the volume 1, and the volume 1 is associated with the snapshot 1', and a snapshot 2' is obtained by performing a snapshot operation on the volume 2, and the volume 2 is associated with the snapshot 2'.

Associating a volume with a snapshot by the volume management program is recording an association relationship between the volume and the snapshot. For example, when creating a snapshot, the volume management program generates a snapshot identifier corresponding to the snapshot, when creating a volume, the volume management program generates a volume identifier corresponding to the volume, and the volume management program records an association relationship between the snapshot identifier and the volume identifier.

The snapshot identifier may be determined based on the volume identifier, or may be a character string that is randomly allocated by the volume management program. A form of the snapshot identifier is not limited in this embodiment. The volume identifier may be a character string that is randomly allocated by the volume management program, or may be a character string that is generated based on a generation sequence, or may be a character string that is generated based on a generation sequence and an identifier of a cloud host to which the volume belongs. A form of the volume identifier is not limited in this embodiment.

The snapshot corresponding to the volume is also a volume in essence, and the snapshot is obtained by copying the volume. Different data may be separately stored in the volume and the corresponding snapshot. The snapshot corresponding to the volume also has the lazy loading attribute. A storage location of data in the snapshot is in a one-to-one correspondence with a storage location of the data in the volume. For example, for data 1, if a storage location of the data 1 in the volume is a location 1, a storage location of the data 1 in the snapshot is also a location 1.

Figure 2A:
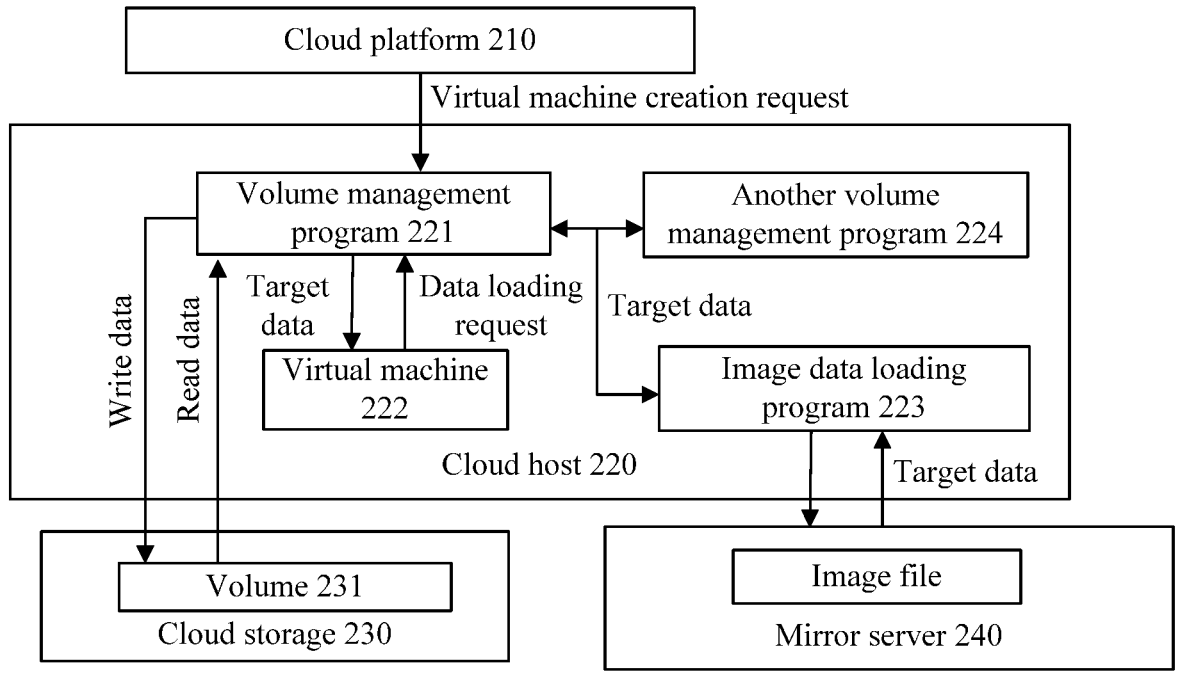
FIG. 2A and FIG. 2B are schematic diagrams of data loading methods in related technologies according to an example embodiment of this application.

Referring to FIG. 2A, FIG. 2A is a schematic diagram of a data loading method provided in a related technology.

1. A cloud platform 210 sends a virtual machine creation request to a cloud host 220, and a volume management program 221 in the cloud host 220 creates a virtual machine 222 based on creation information in the virtual machine creation request, and creates a blank volume 231 in cloud storage 230. Before the virtual machine 222 is started, the volume management program mounts the blank volume 231 to the cloud host 220, and associates the volume 231 with an image file in a mirror server 240.

Optionally, mounting the blank volume 231 to the cloud host 220 is mounting the volume 231 to a specific directory in the cloud host 220 as a partition of the cloud host 220. In this way, when needing to access data in the volume 231, the virtual machine 222 accesses the specific directory using the volume management program 221 in order to access the volume 231.

Optionally, associating the volume 231 with the image file by the volume management program 221 is recording an association relationship between the volume 231 and the image file.

2. After being started, the virtual machine 222 sends a data loading request to the volume management program 221, and the volume management program 221 searches, based on the data loading request, the volume 231 for target data that is indicated by the data loading request.

3. When failing to find the target data in the volume 231, the volume management program 221 writes the target data from the mirror server 240 into the volume 231 using an image data loading program 223.

4. The volume management program 221 reads the target data in the volume 231 and sends the target data to the virtual machine 222.

5. Another volume management program 224 loads data other than the data in the volume 231 to the volume 231 (not shown in the figure) in the background based on a data sequence from the mirror server 240 using the image data loading program 223.

Optionally, the data sequence is a sequence of storage locations of the data in the volume 231. For example, the data sequence is a sequence of logical numbers of the data in the volume from the smallest to the largest.

Figure 2B:
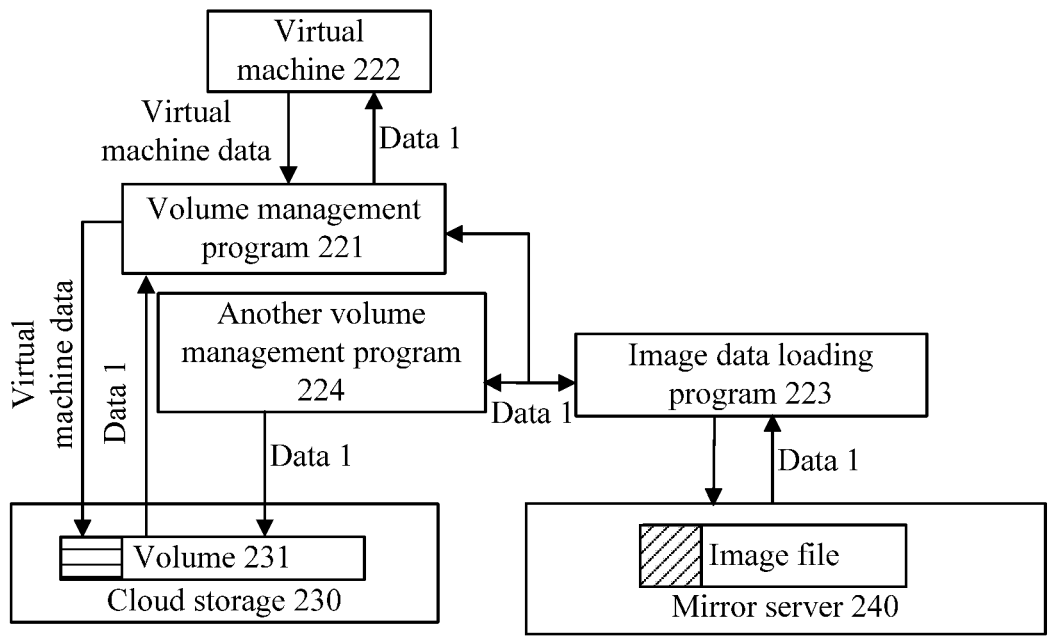

In the foregoing data loading process, referring to FIG. 2B, if the volume management program 221 loads data 1 (indicated by a shaded part with left slashes) from the mirror server 240 based on the data loading request of the virtual machine 222, and the other volume management program 224 loads the data 1 in the background based on the data sequence from the mirror server 240, the following cases may occur.

The volume management program 221 first writes the data 1 into the volume 231, and then reads the data 1 in the volume 231 and sends the data 1 to the virtual machine 222. After receiving the data 1, the virtual machine 222 generates virtual machine data and writes the virtual machine data into a location (indicated by a shaded part with horizontal lines) corresponding to the data 1. In this case, the other volume management program 224 writes the data 1 into the volume 231 in the background based on the data sequence, causing a problem that old data (the data 1) overwrites new data (the virtual machine data), that is, a data conflict.

In addition, when there are at least two virtual machines (including a first virtual machine and a second virtual machine) sharing a same volume, the first virtual machine first request the volume management program to load the data 1, and if the data 1 is not stored in the volume, the volume management program loads the data 1 from the mirror server using the image data loading program.

If the second virtual machine also requests the volume management program to load the data 1 at this time, because the volume management program has not written the data 1 into the volume, the volume management program loads the data 1 from the mirror server using the image data loading program.

Then, the volume management program writes the data 1 into the volume based on the data loading request of the first virtual machine and sends the data 1 in the volume to the virtual machine. After obtaining the data 1, the virtual machine generates virtual machine data and writes the virtual machine data into the volume.

If the volume management program writes the data 1 into the volume based on the data loading request of the second virtual machine after the virtual machine data is written into the volume, a problem that old data (the data 1) overwrites new data (the virtual machine data), that is, a data conflict, is caused.

In view of the foregoing technical problems, this application provides the following technical solutions.

Figure 3:
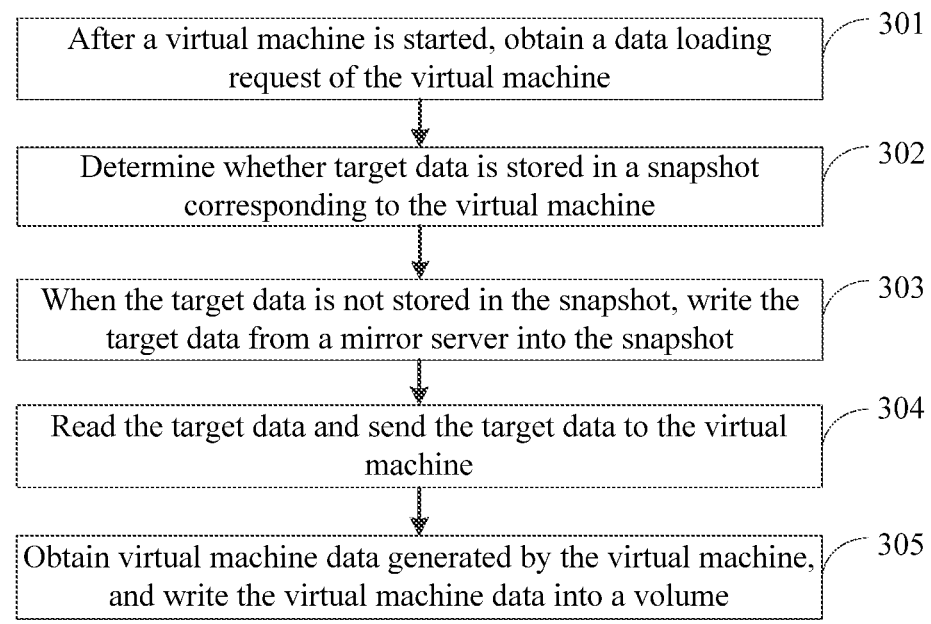
FIG. 3 is a flowchart of a data loading method according to an example embodiment of this application.

Referring to FIG. 3, FIG. 3 is a flowchart of a data loading method according to an example embodiment of this application. The method is applied to the data loading system shown in FIG. 1A and FIG. 1B, and each step is performed by a volume management program. The method includes the following several steps.

Step 301: After a virtual machine is started, obtain a data loading request of the virtual machine.

The data loading request is used to request to load target data in an image file. The target data is data requested by the virtual machine in a running process, that is, data required by the virtual machine based on a current running status. The image file is stored in a mirror server.

The virtual machine is created in a cloud host and is started in the cloud host in control of a cloud platform. Before the virtual machine is started, the volume management program in the cloud host needs to mount a volume corresponding to the virtual machine to the cloud host.

The volume corresponding to the virtual machine is created in cloud storage by the volume management program (a primary management program) when the virtual machine is created in the cloud host. Before the virtual machine is initially started, the volume corresponding to the virtual machine is a blank volume. In other words, when the volume management program creates the virtual machine, the corresponding volume that is created is a blank volume.

In this application, the volume corresponding to the virtual machine has a lazy loading attribute.

In addition, in this application, after creating the blank volume corresponding to the virtual machine, the volume management program further performs a snapshot operation on the blank volume to obtain a snapshot corresponding to the volume. After creating the snapshot corresponding to the volume, the volume management program associates the volume with the snapshot.

After creating the blank volume and the corresponding snapshot, the primary management program associates the snapshot with the image file in the mirror server. The snapshot is associated with the image file in the mirror server such that the volume management program (the volume management program corresponding to the virtual machine, which may be the primary management program or may be a service management program) can write data in the image file into the snapshot using an image data loading program.

Optionally, associating the snapshot with the image file is recording an association relationship between the snapshot and the image file. For example, when creating the snapshot, the volume management program generates a snapshot identifier corresponding to the snapshot, the image file stored in the mirror server has a corresponding file identifier, and the volume management program records an association relationship between the snapshot identifier and the file identifier.

The file identifier may be read from the mirror server using the image data loading program. The file identifier may be a name of the image file, or may be a character string that is randomly allocated by the mirror server. A form of the file identifier is not limited in this embodiment.

After the volume management program mounts the volume to the cloud host, if the virtual machine is started, and the target data in the image file needs to be loaded from the mirror server, the virtual machine sends the data loading request to the volume management program. Correspondingly, the volume management program receives the data loading request.

Optionally, the data loading request carries a storage location of the target data in the volume.

Step 302: Determine whether target data is stored in a snapshot corresponding to the virtual machine.

The snapshot is obtained based on the blank volume corresponding to the virtual machine when the virtual machine is created, the volume is associated with the corresponding snapshot, the snapshot is used to lazily load the image file, and the snapshot is associated with the image file.

Optionally, determining, by the volume management program, whether target data is stored in a snapshot corresponding to the virtual machine includes but is not limited to the following several implementations.

In a first implementation, the volume management program queries, in the snapshot, whether the target data is stored in the storage location indicated by the data loading request. If the target data is not stored in the snapshot, step 303 is performed.

Optionally, when the target data is stored in the snapshot, the volume management program sends the snapshot or the target data in the volume corresponding to the snapshot to the virtual machine.

In a second implementation, the volume management program queries, in the volume based on the storage location indicated by the data loading request, whether the target data is stored in the storage location, and when the target data is not stored in the storage location in the volume, queries whether the target data is stored in the storage location in the snapshot corresponding to the volume.

When the target data is stored in the storage location in the volume, the volume management program reads the target data in the volume and transfers the target data to the virtual machine.

When the target data is not stored in the storage location in the volume, but the target data is stored in the storage location in the snapshot, the volume management program reads the target data in the snapshot and transfers the target data to the virtual machine.

When the target data is not stored in the volume or the snapshot, step 303 is performed.

Figure 4:
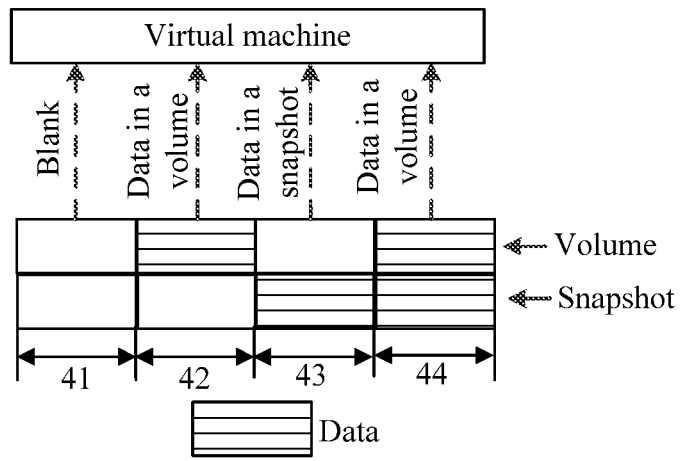
FIG. 4 is a schematic diagram of data loading according to an example embodiment of this application.

Referring to FIG. 4, when the storage location of the target data is in an area 41, because the target data is not stored in the area 41 of both the volume and the snapshot, the volume management program reads the target data from the image file of the mirror server using the image data loading program, writes the target data into the snapshot, and then reads the target data and returns the target data to the virtual machine. When the storage location of the target data is in an area 42, because the target data is stored in the area 42 of the volume but the target data is not stored in the area 42 of the snapshot, the volume management program returns the target data in the volume to the virtual machine. When the storage location of the target data is in an area 43, because the target data is not stored in the area 43 of the volume but the target data is stored in the area 43 of the snapshot, the volume management program returns the target data in the snapshot to the virtual machine. When the storage location of the target data is in an area 44, because the target data is stored in the area 44 of both the volume and the snapshot, the volume management program returns the target data in the volume to the virtual machine.

Step 303: When the target data is not stored in the snapshot, write the target data from a mirror server into the snapshot.

The volume management program writes the target data from the mirror server into the snapshot using the image data loading program. The image data loading program is used to manage the image file in the mirror server and write data in the image file into the snapshot based on a data loading indication of the volume management program.

Writing, by the volume management program, the target data from a mirror server into the snapshot includes sending, by the volume management program, the data loading indication to the image data loading program, sending, by the image data loading program, the target data to the volume management program based on the data loading indication, and writing, by the volume management program, the target data into the snapshot.

Optionally, the data loading indication includes the storage location corresponding to the target data.

In addition, the volume management program may further load data in the image file except the target data to the snapshot in the background.

Optionally, the volume management program that loads the data in the image file in the background is different from the volume management program that loads the target data.

The loading, by the volume management program, data in the image file except the target data to the snapshot includes, before loading data from the image file in the background, detecting, by the volume management program, whether the to-be-loaded data is stored in the volume and the snapshot, and when the to-be-loaded data is not stored in the volume or the snapshot, loading, by the volume management program, the to-be-loaded data from the image file, or when the to-be-loaded data is stored in the volume or the snapshot, replacing the to-be-loaded data with a next part of data in the storage location, and re-performing the step of detecting whether the to-be-loaded data is stored in the volume and the snapshot.

Step 304: Read the target data and send the target data to the virtual machine.

After the volume management program writes the target data into the snapshot, the volume management program reads the target data based on a normal data reading operation.

Because the volume and the snapshot are associated, the normal data reading operation includes first querying, by the volume management program, whether the target data is stored in the volume, where the target data is not stored in the volume, then querying, by the volume management program, whether the target data is stored in the snapshot corresponding to the volume, where the target data is stored in the snapshot, and reading, by the volume management program, the target data from the snapshot, and sending the target data to the virtual machine.

Optionally, if a first part of data in the target data is in the volume, and a second part of data in the target data is in the snapshot, the volume management program first queries whether the target data is stored in the volume, because the first part of the data is stored in the volume, the volume management program first reads the first part of the data from the volume, then the volume management program queries whether the second part of the data is stored in the snapshot corresponding to the volume, and because the second part of the data is stored in the snapshot, the volume management program reads the second part of the data from the snapshot, combines the first part of the data and the second part of the data into the target data, and sends the target data to the virtual machine.

Step 305: Obtain virtual machine data generated by the virtual machine, and write the virtual machine data into the volume.

Optionally, the virtual machine data is generated based on the target data. In this case, after the volume management program sends the target data in the storage location indicated by the data loading request to the virtual machine, the virtual machine generates the virtual machine data based on the target data, and sends the virtual machine data to the volume management program, and the volume management program writes the virtual machine data into the corresponding storage location in the volume.

Optionally, the volume management program writes the virtual machine data into the volume at a granularity of an I/O operation performed on the volume and the snapshot.

The granularity of the I/O operation refers to a minimum data amount of data that is read from the volume or the snapshot by the volume management program, or a minimum data amount of data that is written into the volume by the volume management program.

The writing, by the volume management program, the virtual machine data into the volume at a granularity of an I/O operation includes, when a size of the target data is less than the granularity of the I/O operation, reading, by the volume management program, a data block that includes the target data from the snapshot, and sending the data block to the virtual machine, where a size of the data block is equal to the granularity of the I/O operation, receiving, by the virtual machine, the data block, and generating the virtual machine data (whose data amount is the same as that of the target data) based on the target data in the data block, and obtaining, by the volume management program, the virtual machine data, combining the virtual machine data and the read data block to obtain new virtual machine data (whose data amount is the same as that of the data block), and writing the new virtual machine data into the volume.

Optionally, combining, by the volume management program, the virtual machine data and the read data block includes replacing data that is in the data block and whose storage location is the same as that of the virtual machine data with the virtual machine data.

Figure 5:
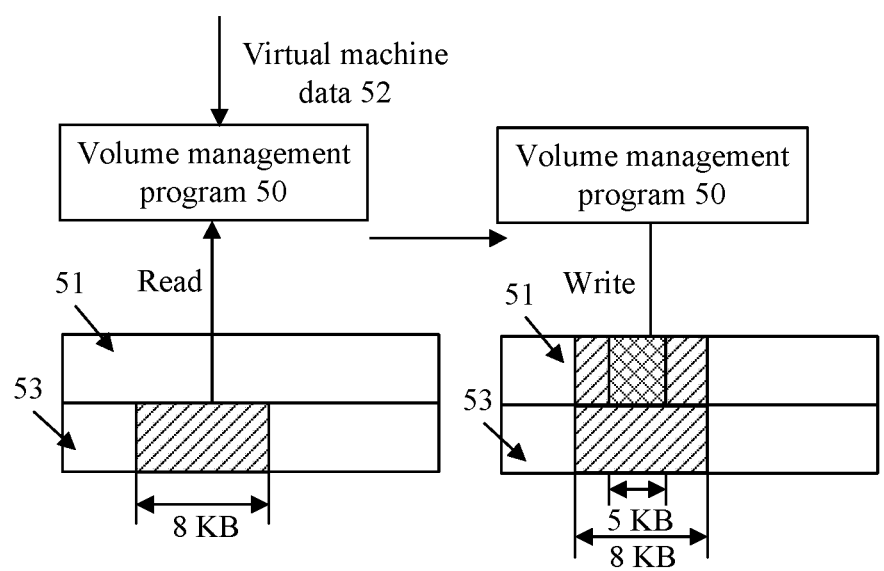
FIG. 5 is a schematic diagram of writing virtual machine data according to an example embodiment of this application.

Referring to FIG. 5, FIG. 5 is a schematic diagram of writing virtual machine data into a volume by a volume management program. It is assumed that a granularity of an I/O operation performed by a volume management program 50 on a volume 51 is 8 kilobytes (KB). When a size of virtual machine data 52 is less than 8 KB, for example, is 5 KB, the volume management program 50 first reads 8 KB data (indicated by a shaded part with left slashes in the figure) from a snapshot 53. A storage location corresponding to the 8 KB data includes a storage location corresponding to the 5 KB virtual machine data. After obtaining the 8 KB data, the volume management program 50 combines the 8 KB data and the 5 KB virtual machine data to obtain new 8 KB virtual machine data, and then writes the new 8 KB virtual machine data into the volume 51. The new 8 KB virtual machine data includes the 5 KB virtual machine data (indicated by a shaded part with double slashes in the figure) generated by a virtual machine.

The data loading method provided in this embodiment is described below using an example.

Figure 6A:
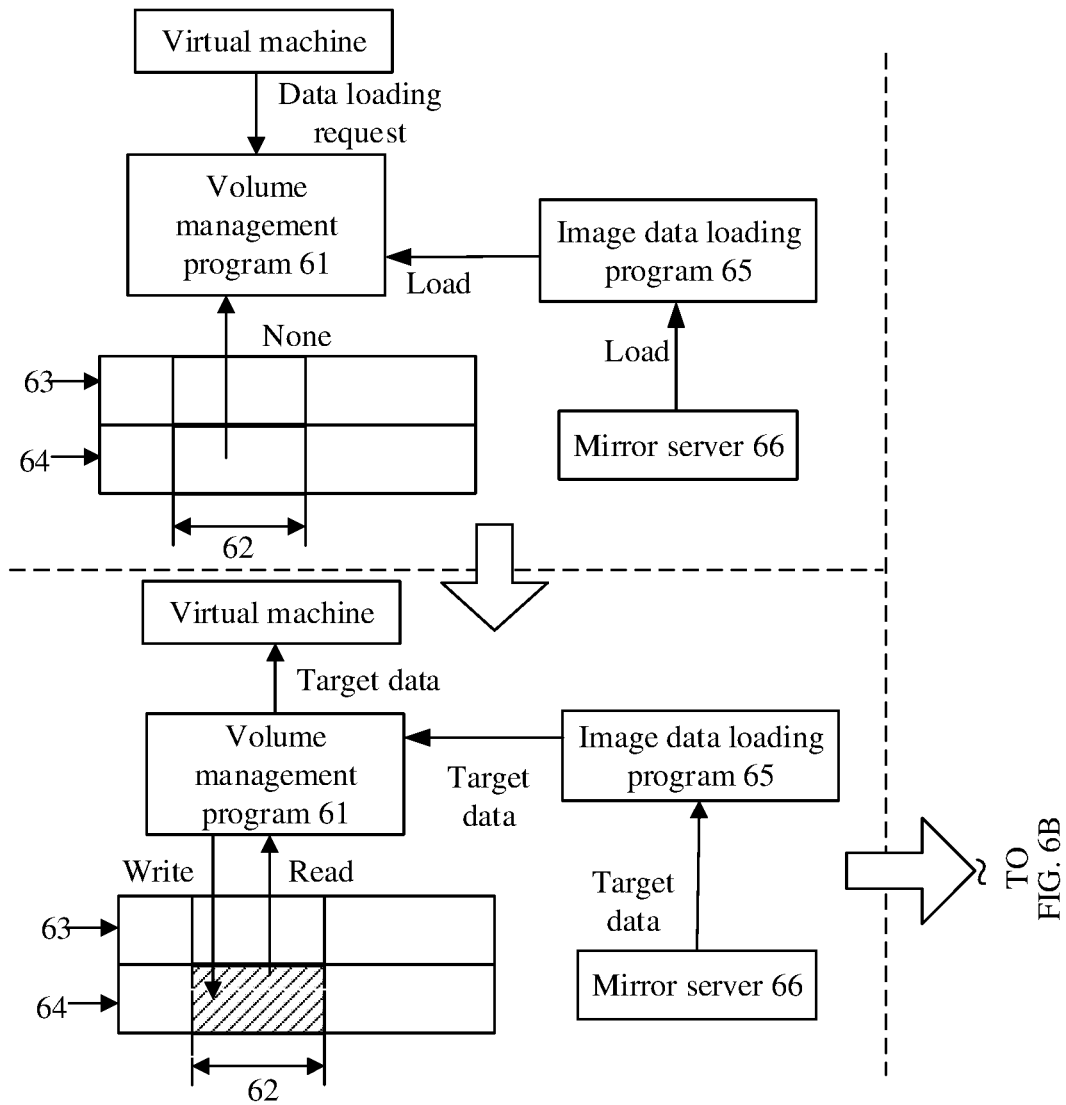
FIG. 6A and FIG. 6B are a schematic diagram of data loading according to an example embodiment of this application.
Figure 6B:
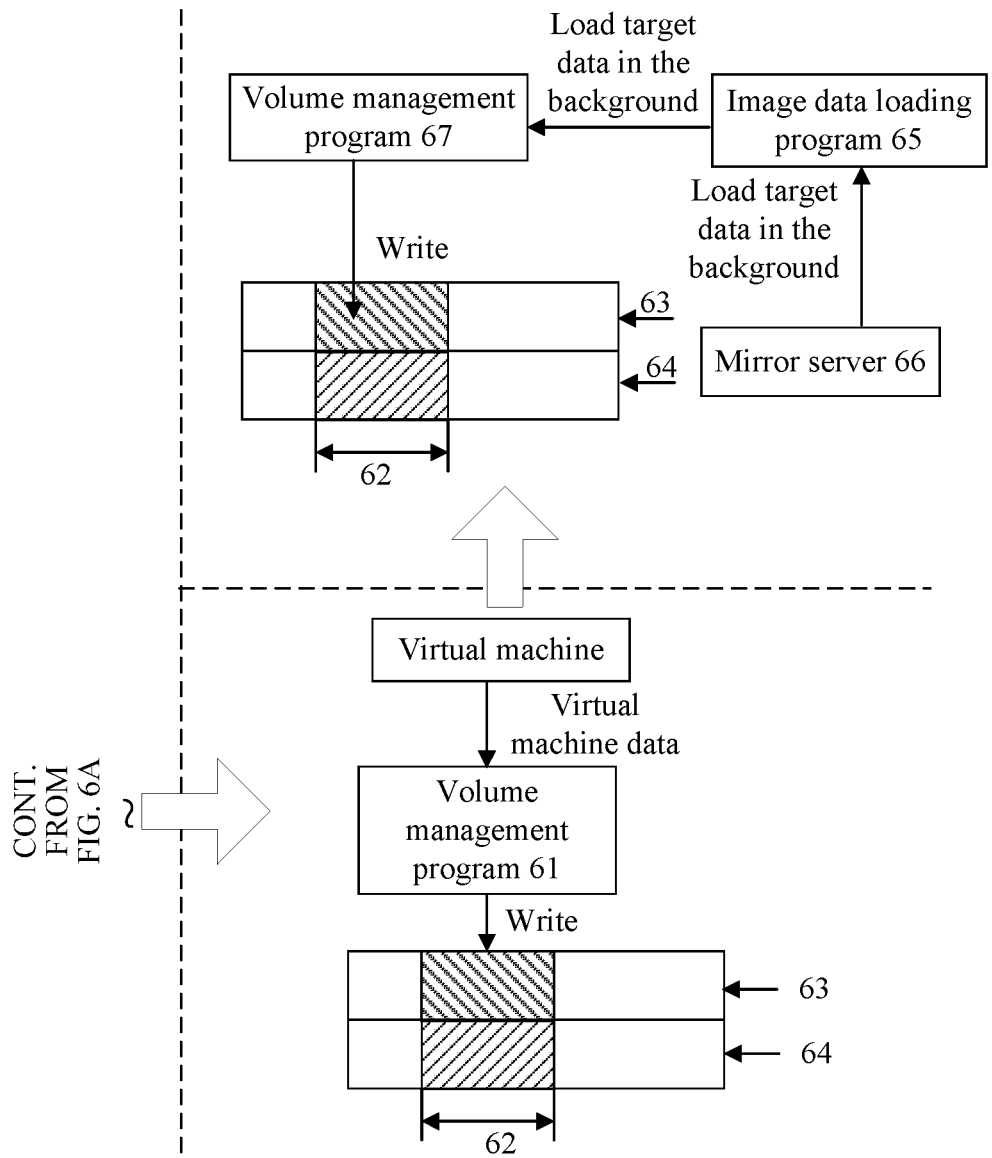

Referring to FIG. 6A and FIG. 6B, a volume management program 61 receives a data loading request sent by a virtual machine, where a storage location of target data indicated by the data loading request is 62.

The volume management program queries whether the target data is stored in the storage location 62 of a volume 63, and if the target data is not stored in the storage location 62, continues to query whether the target data is stored in the storage location 62 of a snapshot 64 corresponding to the volume 63, where the target data is not stored in the storage location 62.

The volume management program 61 loads the target data in an image file from a mirror server 66 using an image data loading program 65. The volume management program 61 writes the target data into the storage location 62 (indicated by a shade with left slashes in the figure) of the snapshot 64, reads, based on a normal reading operation, the target data stored in the storage location 62 of the snapshot 64, and then sends the target data to the virtual machine.

The virtual machine generates virtual machine data based on the target data, and sends the virtual machine data to the volume management program 61.

The volume management program 61 writes the virtual machine data into the volume 63 (indicated by a shade with right slashes). In this case, even if a volume management program 67 (which is independent of the volume management program 61) reads the target data again from the mirror server 66 in the background based on a data storage sequence, the volume management program 67 writes the target data into the snapshot 64, and therefore, a problem that old data (the target data) overwrites new data (the virtual machine data) in the volume 63 does not occur.

In addition, when a plurality of virtual machines share the volume 63, after the volume management program 61 writes the virtual machine data into the volume 63, even if the volume management program 61 loads, in response to a data loading request of another virtual machine, the target data in the image file from the mirror server 66 using the image data loading program 65, the target data is written into the snapshot 64 and overwrites the target data in the snapshot, and therefore, a problem that old data (the target data) overwrites new data (the virtual machine data) in the volume 63 does not occur.

In conclusion, according to the data loading method provided in this application, the snapshot corresponding to the volume is created, the data in the mirror server is written into the snapshot in a data loading process, and the virtual machine data generated by the virtual machine is written into the volume. In this way, the following problem can be resolved. After the volume management program writes the virtual machine data generated by the virtual machine into the volume, it is possible that the target data loaded from the mirror server is written into the volume again, and the target data overwrites the virtual machine data, causing a conflict between new data and old data. Because the volume management program separately writes the virtual machine data and the target data into different locations for independent management, the conflict between the new data and the old data does not occur, and a probability of a data loading error of the virtual machine can be reduced.

Optionally, in this application, the virtual machine data may not be generated based on the target data in the image file. When the virtual machine data is not generated based on the target data, and a size of the virtual machine data and the granularity of the I/O operation are in a multiple relationship, the volume management program may directly write the virtual machine data into the volume, without performing steps of reading a data block from the snapshot and combining the data block and the virtual machine data.

Optionally, when the virtual machine data is not generated based on the target data, and a size of the virtual machine data is less than the granularity of the I/O operation, the volume management program needs to read a data block from the snapshot, where a size of the data block is equal to the granularity of the I/O operation, and the data block includes data whose storage location is the same as that of the virtual machine data, and the volume management program obtains the virtual machine data, combines the virtual machine data and the read data block to obtain new virtual machine data, and writes the new virtual machine data into the volume. The new virtual machine data includes the virtual machine data generated by the virtual machine.

Optionally, after the volume management program loads all data in the image file to the snapshot based on a background loading policy, the volume management program switches an attribute of the snapshot from a lazy loading attribute to a normal attribute.

Optionally, the normal attribute is an attribute that the volume management program no longer loads the image file in the mirror server to the snapshot.

Optionally, the switching, by the volume management program, an attribute of the snapshot from a lazy loading attribute to a normal attribute includes changing the attribute of the snapshot from the lazy loading attribute to the normal attribute.

The volume management program records an attribute of each snapshot. When not all the data in the image file is loaded to the snapshot, the volume management program sets the attribute of the snapshot to the lazy loading attribute, and when all the data in the image file is loaded to the snapshot, the volume management program changes the attribute of the snapshot to the normal attribute.

Optionally, the lazy loading attribute and the normal attribute are indicated by characters. For example, a character 1 indicates the lazy loading attribute, and a character 0 indicates the normal attribute.

If the volume management program does not change the attribute of the snapshot after all the data in the image file is loaded to the snapshot, a volume management program that loads data from the mirror server in the background may continuously detect whether there is unloaded data in the snapshot, wasting resources for loading data in the background. In this embodiment, when all the data in the image file is loaded to the snapshot, there is no need to load data from the mirror server. In this case, the attribute of the snapshot is switched from the lazy loading attribute to the normal attribute such that the volume management program can be notified that whether there is unloaded data in the snapshot no longer needs to be detected, thereby saving resources for loading data in the background.

Optionally, after all the data in the image file is loaded to the snapshot, the snapshot is no longer associated with the image file. For example, the volume management program deletes an association relationship between the snapshot and the image file.

In this embodiment, because there is no need to load data from the mirror server in the background when all the data in the image file is loaded to the snapshot, the association relationship between the snapshot and the image file no longer needs to be stored. In this case, deleting the association relationship between the snapshot and the image file can save storage space of the cloud host.

Optionally, after all the data in the image file is loaded to the snapshot, the volume management program combines the data in the snapshot, and stores the data into the volume.

The volume management program combines the data in the snapshot, and stores the data into the volume, in accordance with the following principles.

1. If the data is stored in a same storage location of both the volume and the snapshot, the data in the volume remains unchanged.

2. For a storage location, if the data is not stored in the storage location of the volume, but the data is stored in the storage location of the snapshot, the data in the snapshot is copied to the volume.

3. For a storage location, if the data is stored in the storage location of the volume, but the data is not stored in the storage location of the snapshot, the data in the volume remains unchanged.

Optionally, the volume management program deletes the snapshot after combining the volume and the corresponding snapshot.

In this embodiment, because there is no need to load data from the mirror server in the background when all the data in the image file is loaded to the snapshot, a problem that old data overwrites new data does not occur. In this case, combining the snapshot and the volume and deleting the snapshot can not only ensure accuracy of the data loaded by the virtual machine, but can also save storage resources in the cloud storage.

Optionally, because there may be a plurality of volume management programs that request to load data in a same storage location in a same image file from the mirror server, a larger quantity of volume management programs that request the data in the storage location brings heavier image file management pressure on the mirror server.

Figure 7:
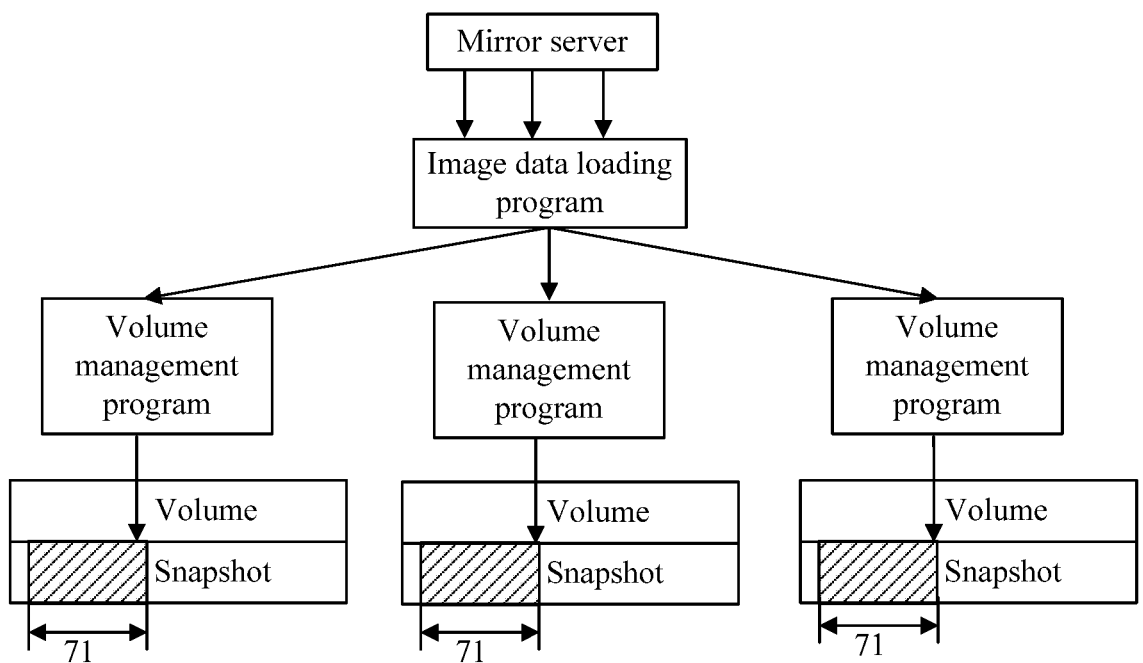
FIG. 7 is a schematic diagram of data loading according to an example embodiment of this application.

Referring to FIG. 7, if there are three volume management programs that request data corresponding to a storage location 71 (indicated by a shaded part), a mirror server needs to send the data corresponding to the storage location 71 to a cloud host three times, and therefore image data processing pressure on the mirror server is relatively heavy.

To reduce pressure on the mirror server, in this application, the volume management program creates a cache volume in the cloud storage, the plurality of volume management programs that load the same image file may share the cache volume, and the data that is in the same storage location of the same image file and that the different volume management programs request to load is stored in the cache volume, and before loading target data from the mirror server, each volume management program first detects whether the target data is stored in the cache volume. In this way, the data in the same storage location of the same image file needs to be loaded only once from the mirror server, thereby reducing image file processing pressure on the mirror server.

Optionally, for the same image file, the cache volume is created when a volume and a snapshot that correspond to the first virtual machine are created. The cache volume is located in the cloud storage. A storage location of data in the cache volume is in a one-to-one correspondence with a storage location of the data in the volume.

Optionally, after creating the cache volume, the primary management program associates the cache volume with a volume management program corresponding to each virtual machine, and associates the cache volume with the image file. In this way, it can be ensured that a volume management program corresponding to a virtual machine loads data in the cache volume based on the data loading request and writes data in the image file into the cache volume.

Optionally, the cache volume may also be referred to as a cache snapshot, an image cache volume, or the like. A name of the cache volume is not limited in this embodiment.

If the primary volume management program creates the cache volume in the cloud storage, based on the embodiment described in FIG. 3, step 303 further includes writing the target data from the mirror server into the cache volume corresponding to the image file, and writing the target data in the cache volume into the snapshot.

When the virtual machine is the first virtual machine that requests to load the target data, the volume management program corresponding to the virtual machine writes the target data from the mirror server into the cache volume.

For example, when the virtual machine is the first virtual machine that requests to load the target data, the volume management program corresponding to the virtual machine queries whether the target data is stored in the cache volume, and when the target data is not stored in the cache volume, the volume management program loads the target data from the mirror server using the image data loading program, and writes the target data into the cache volume. Then, the volume management program corresponding to the virtual machine writes the target data in the cache volume into the corresponding snapshot, and then sends data in the snapshot to the virtual machine.

Optionally, when the volume management program corresponding to the virtual machine loads the target data from the mirror server using the image data loading program, a response suspended permission of the target data is marked. In this way, when another virtual machine also requests the target data, a volume management program corresponding to the other virtual machine suspends, based on the response suspended permission, responding to a data loading request of the other virtual machine, and after the volume management program corresponding to the virtual machine writes the target data into the cache volume, the response suspended permission of the target data is changed to a response allowed permission, and in this case, the volume management program corresponding to the other virtual machine writes, based on the response allowed permission, the target data in the cache volume into a snapshot corresponding to the other virtual machine.

Optionally, an initial response permission of data stored in each storage location in the cache volume is the response allowed permission.

The response allowed permission of data is a permission to allow a volume management program to respond to a data loading request, for example, a permission to allow target data to be written into a corresponding snapshot when the target data is stored in the cache volume, and for another example, a permission to allow a volume management program to load target data from a mirror server and write the target data into a corresponding snapshot when the target data is not stored in the cache volume.

The response suspended permission of data is a permission to temporarily forbid a volume management program to respond to a data loading request, for example, a permission to forbid a volume management program to load target data from a mirror server when the target data is not stored in the cache volume and there is a volume management program that is loading the target data from the mirror server.

For example, when the virtual machine is not the first virtual machine that requests to load the target data, if the target data is not stored in the cache volume, the volume management program corresponding to the virtual machine suspends responding to the data loading request of the virtual machine until the target data is written into the cache volume.

Optionally, when the virtual machine is not the first virtual machine that requests to load the target data, the volume management program corresponding to the virtual machine suspends, based on the response suspended permission of the target data, responding to the data loading request of the virtual machine, and only when the target data is changed from the response suspended permission to the response allowed permission, the volume management program corresponding to the virtual machine writes the target data in the cache volume into the corresponding snapshot and then sends data in the snapshot to the virtual machine.

Figure 8A:
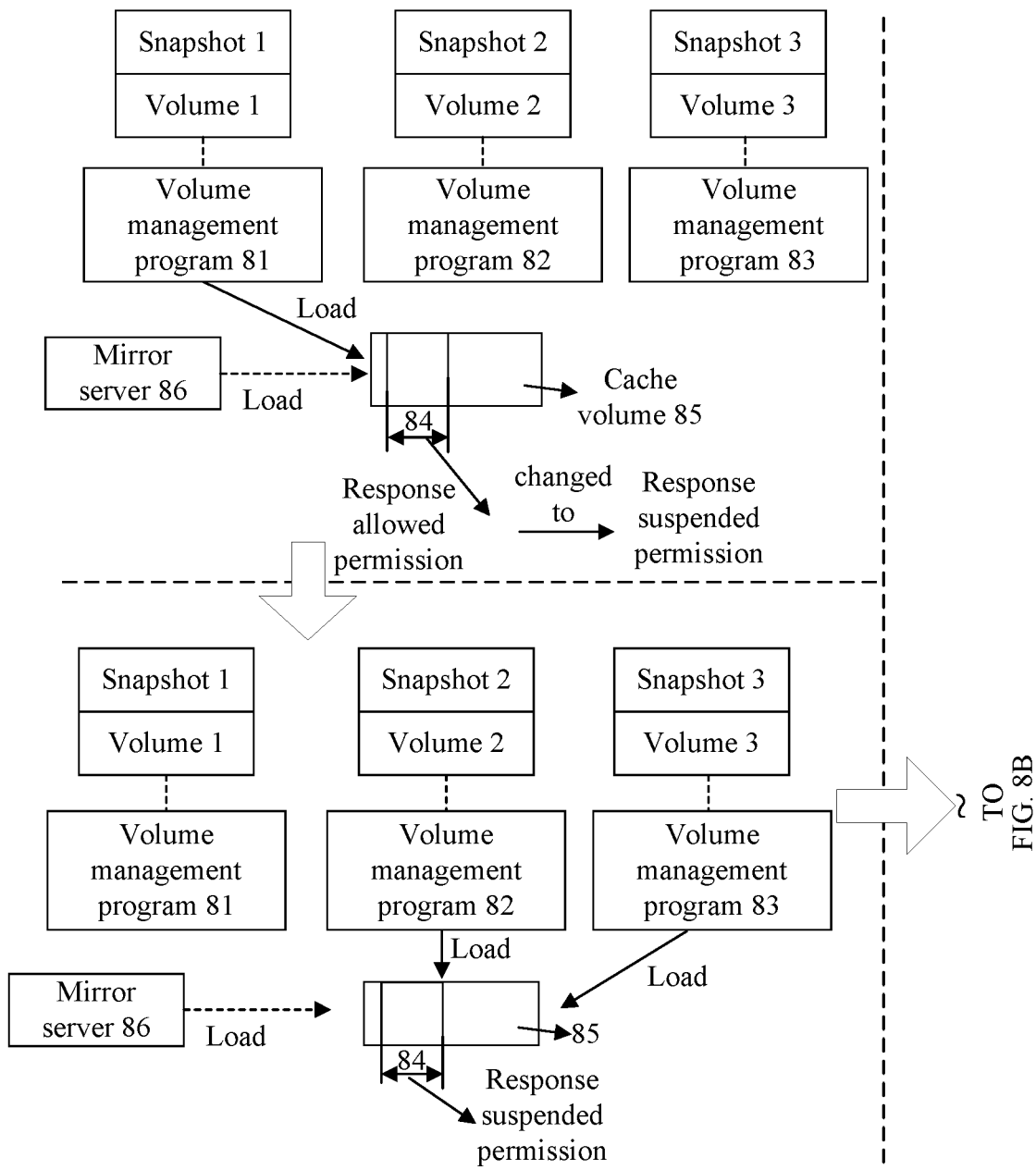
FIG. 8A and FIG. 8B are a schematic diagram of data loading according to an example embodiment of this application.
Figure 8B:
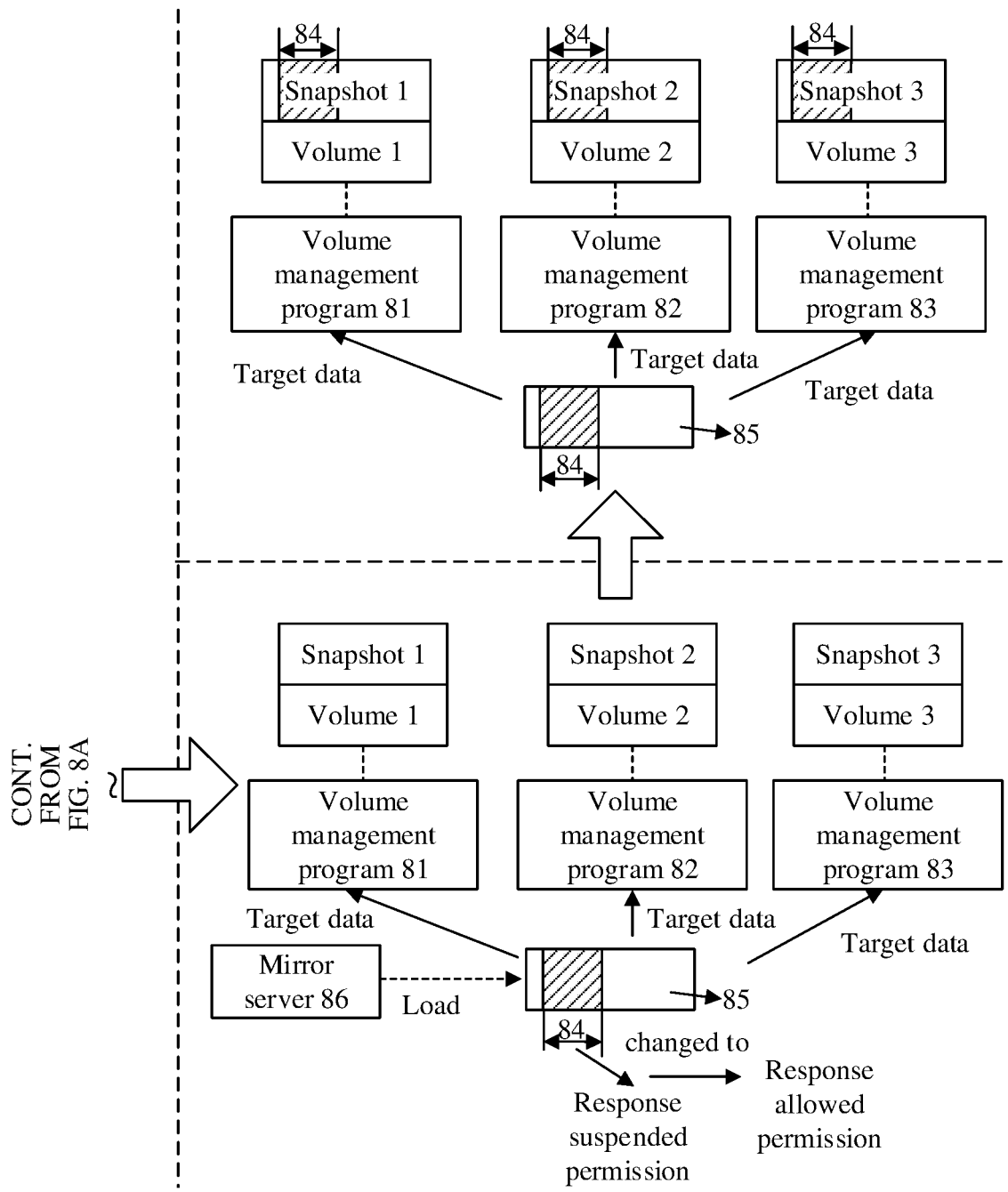

Optionally, referring to FIG. 8A and FIG. 8B, it is assumed that, volume management programs 81, 82, and 83 all need to load target data corresponding to a storage location 84, and the target data is not stored in a volume and a snapshot that are managed by the volume management programs 81, 82, and 83. A virtual machine managed by the volume management program 81 is the first virtual machine that requests to load the target data, and the volume management program 81 obtains a response permission of a cache volume 85, where the response permission is a response allowed permission. Then, the volume management program 81 queries whether the target data corresponding to the storage location 84 is stored in the cache volume 85. When the target data is not stored in the cache volume 85, the volume management program 81 loads the target data from a mirror server 86 and sets a response suspended permission of the target data.

At least one virtual machine managed by the volume management programs 82 and 83 sends a data loading request. After receiving the data loading request, the volume management programs 82 and 83 obtain the response permission of the cache volume 85. In this case, the response permission is the response suspended permission, and the volume management programs 82 and 83 suspend responding to the data loading request sent by the at least one virtual machine.

After writing the target data into the cache volume 85 (indicated by a shaded part with left slashes in the figure), the volume management program 81 sets the response allowed permission of the target data. The volume management programs 82 and 83 respond to the data loading request of the managed virtual machine based on the response allowed permission.

The volume management program 81 writes the target data in the cache volume 85 into a corresponding snapshot 1 (indicated by a shaded part with left slashes in the figure), and then sends the target data in the snapshot 1 to a virtual machine that sends a data loading request, where the virtual machine is managed by the volume management program 81.

The volume management program 82 writes the target data in the cache volume 85 into a corresponding snapshot 2 (indicated by a shaded part with left slashes in the figure), and then sends the target data in the snapshot 2 to a virtual machine that sends a data loading request, where the virtual machine is managed by the volume management program 82.

The volume management program 83 writes the target data in the cache volume 85 into a corresponding snapshot 3 (indicated by a shaded part with left slashes in the figure), and then sends the target data in the snapshot 3 to a virtual machine that sends a data loading request, where the virtual machine is managed by the volume management program 83.

In conclusion, according to the data loading method provided in this embodiment, the cache volume is created in the cloud storage, each volume management program in a cloud host first searches for target data in the cache volume before loading the target data from the mirror server. In this way, data corresponding to each storage location in the cache volume needs to be loaded only once from the mirror server, and the mirror server does not need to process data in a same storage location a plurality of times, thereby reducing image data processing pressure on the mirror server.

Optionally, for a same image file, when all the data in the image file has been loaded in a snapshot corresponding to at least one volume management program that requests data from the cache volume, the primary management program deletes the cache volume.

Optionally, the primary management program determines the at least one volume management program that requests the data from the cache volume, and after all the data in the cache volume has been loaded, periodically detects whether an attribute of the snapshot corresponding to the at least one volume management program is a normal attribute. When the attribute of the snapshot corresponding to the at least one volume management program is the normal attribute, it indicates that all the data in the image file has been loaded in the snapshot corresponding to the at least one volume management program, and in this case, the primary management program deletes the cache volume.

Optionally, the primary volume management program determines, using a cloud platform, the at least one volume management program that requests data from the cache volume.

In this embodiment, when data has been loaded in the snapshot corresponding to the at least one volume management program that requests data from the cache volume, the primary volume management program deletes the cache volume such that the cache volume does not need to occupy a resource in the cloud storage after a data lazy loading process is completed, saving storage resources in the cloud storage.

Optionally, the cache volume in the cloud storage may be a snapshot corresponding to an already created virtual machine, and the already created virtual machine includes a virtual machine that sends the data loading request.

In an example, for an image file, the cache volume is a snapshot corresponding to the first virtual machine that is created in the cloud platform based on the image file.

For a same image file, after creating a volume and a snapshot that correspond to the first virtual machine, the primary management program sets an attribute of the snapshot to a cache volume attribute. For example, the primary management program records an attribute of a snapshot corresponding to the first created virtual machine as the cache volume attribute. After creating a snapshot corresponding to another virtual machine based on the image file, the primary management program detects whether a snapshot having the cache volume attribute has been created. When detecting that the snapshot having the cache volume attribute has been created, the primary management program no longer sets an attribute of the snapshot corresponding to the other virtual machine to the cache volume attribute.

In another example, the cache volume is a snapshot corresponding to the first virtual machine that requests data in the image file.

After the primary management program creates snapshots corresponding to at least two virtual machines, in a running process of each virtual machine, a volume management program corresponding to the first virtual machine that sends a data loading request marks a corresponding snapshot as the cache volume, and sends a snapshot identifier of the snapshot to the primary management program. The at least two virtual machines request to load data in a same image file.

In this embodiment, the volume management program corresponding to the cache volume may be the same as the volume management program corresponding to the first virtual machine that requests target data.

Optionally, after creating the snapshot having the cache volume attribute, the volume management program associates the snapshot with a volume management program corresponding to the other virtual machine. For example, after creating the snapshot having the cache volume attribute, the volume management program sends an identifier of the snapshot to the volume management program corresponding to the other virtual machine, and the volume management program corresponding to the other virtual machine records the identifier of the snapshot.

Figure 9A:
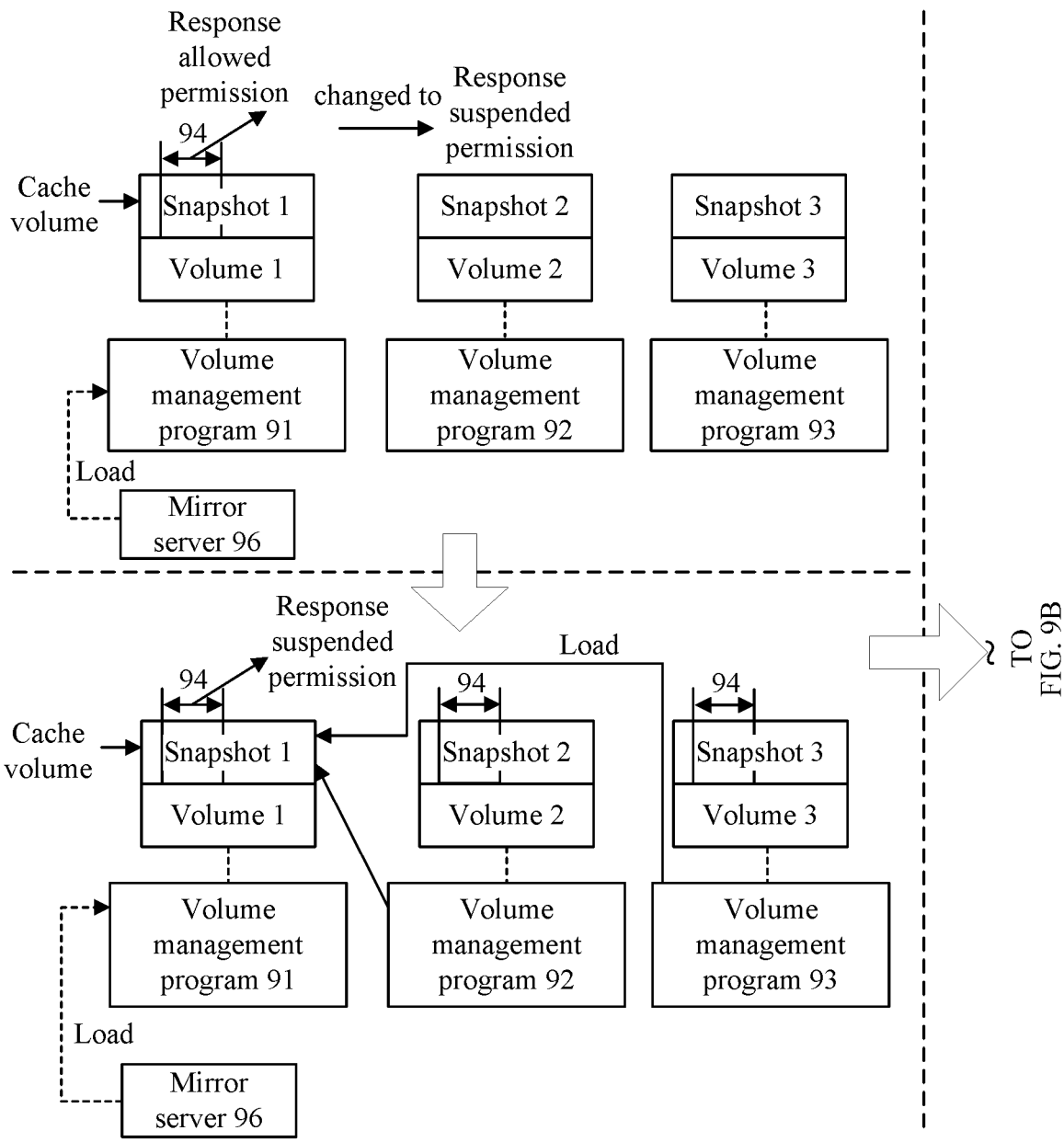
FIG. 9A and FIG. 9B are a schematic diagram of data loading according to an example embodiment of this application.
Figure 9B:
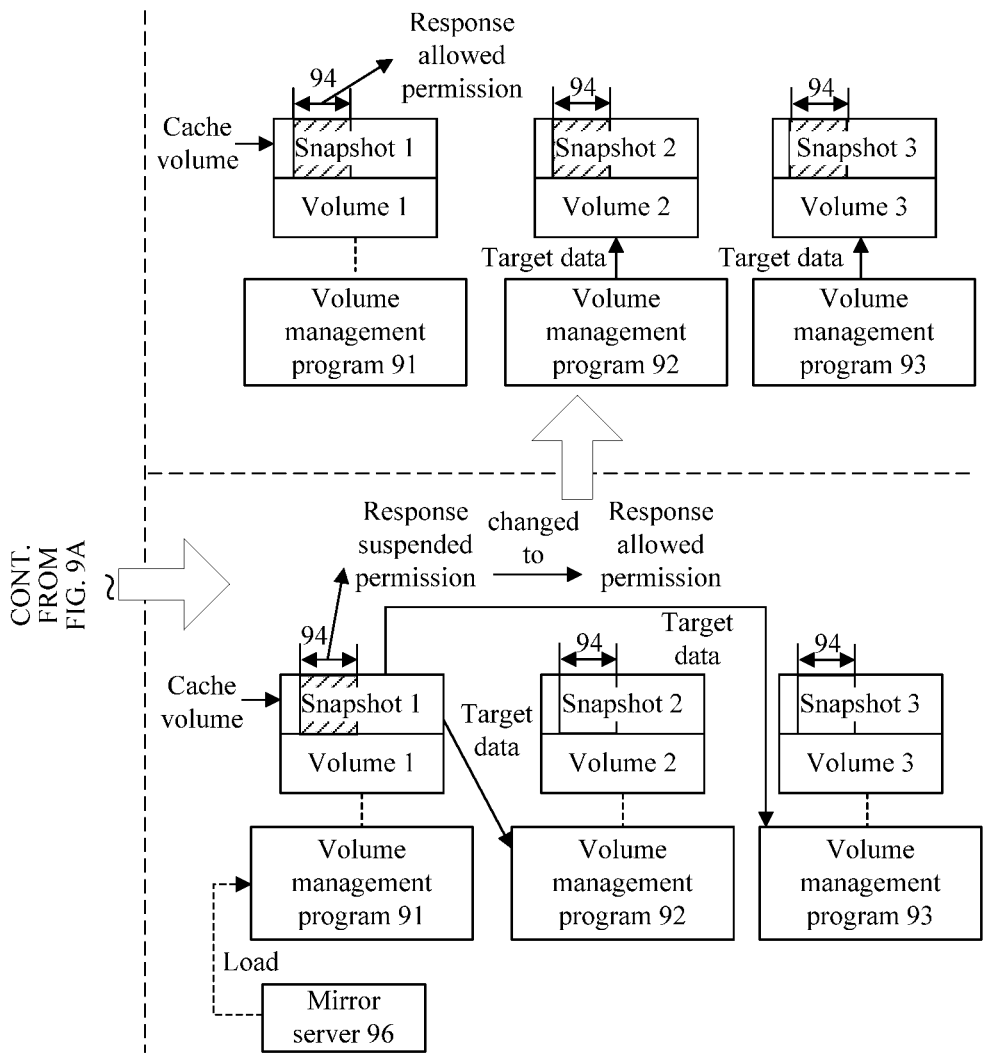

Referring to FIG. 9A and FIG. 9B, it is assumed that, volume management programs 91, 92, and 93 all need to load target data corresponding to a storage location 94, and the target data is not stored in a volume and a snapshot that are managed by the volume management programs 91, 92, and 93. A virtual machine managed by the volume management program 91 is the first virtual machine that requests to load the target data, and a snapshot 1 corresponding to the volume management program 91 is a cache volume.

The volume management program 91 obtains a response permission (including a response suspended permission or a response allowed permission) of the target data in a cache volume 95 based on a data loading request that is sent by the virtual machine, where the response permission is the response allowed permission. Then, the volume management program 91 queries whether the target data corresponding to the storage location 94 is stored in the snapshot 1. When the target data is not stored in the snapshot 1, the volume management program 91 loads the target data from a mirror server 96, and sets a response suspended permission of the target data.

At least one virtual machine managed by the volume management programs 92 and 93 sends a data loading request. After receiving the data loading request, the volume management programs 92 and 93 obtain the response permission of the snapshot 1. The data loading request is used to request the target data corresponding to the storage location 94. In this case, the target data is of the response suspended permission, and the volume management programs 92 and 93 suspend responding to the data loading request sent by the at least one virtual machine.

After writing the target data into the snapshot 1, the volume management program 91 sets the response allowed permission of the target data. The volume management programs 92 and 93 respond to the data loading request of the managed virtual machine based on the response allowed permission.

The volume management program 92 writes the target data in the snapshot 1 into a corresponding snapshot 2, and then sends the target data in the snapshot 2 to a virtual machine that sends a data loading request, where the virtual machine is managed by the volume management program 92.

The volume management program 93 writes the target data in the snapshot 1 into a corresponding snapshot 3, and then sends the target data in the snapshot 3 to a virtual machine that sends a data loading request, where the virtual machine is managed by the volume management program 93.

In conclusion, according to the data loading method provided in this embodiment, a snapshot of an already created virtual machine is set as a cache volume such that a primary management program does not need to additionally create a cache volume in cloud storage. In this way, the cache volume does not need to additionally occupy a storage resource in the cloud storage, thereby saving storage resources in the cloud storage.

Optionally, when all data in an image file has been loaded to the cache volume, and all the data in the image file has been loaded to a snapshot corresponding to another virtual machine that uses the image file, data in the cache volume is combined and stored into a volume corresponding to the already created virtual machine.

When all the data in the image file has been loaded to a snapshot having a cache volume attribute, a volume management program corresponding to the snapshot needs to combine data in the snapshot and data in the volume. Therefore, in this embodiment, to ensure that a virtual machine that loads data based on the snapshot can continue to load data from the snapshot, when a snapshot corresponding to another virtual machine that uses the image file has loaded all the data in the image file, the volume management program then combines the snapshot having the cache volume attribute and the corresponding volume.

Optionally, when the snapshot having the cache volume attribute has loaded all the data in the image file, the volume management program corresponding to the snapshot having the cache volume attribute queries whether an attribute of an associated snapshot is a normal attribute, and when attributes of all associated snapshots are the normal attribute, combines the snapshot and the corresponding volume.

The snapshot associated with the snapshot having the cache volume attribute is obtained from the primary management program by the volume management program, or is prestored by the volume management program.

In this embodiment, when all the data in the image file has been loaded to the cache volume, and all the data in the image file has been loaded to the snapshot corresponding to the other virtual machine that uses the image file, the data in the cache volume is combined and stored into the volume corresponding to the already created virtual machine, thereby ensuring that a snapshot associated with the cache volume can still load data from the cache volume when all the data in the image file has been loaded to the cache volume, and ensuring validity of the cache volume.

Optionally, after data in the cache volume is combined and stored into the volume corresponding to the already created virtual machine, a volume management program corresponding to the cache volume deletes the cache volume.

Optionally, in this application, after the snapshot corresponding to the virtual machine has loaded all the data in the image file, the volume management program sends the data stored in the volume to a backup storage system, where the backup storage system is configured to use the data stored in the volume as incremental backup data of the virtual machine, use an image file stored in the mirror server as full backup data of the virtual machine, and perform data recovery for the virtual machine based on the full backup data and the incremental backup data.

Damage or a data loss may be caused to the volume corresponding to the virtual machine. Therefore, to ensure that the virtual machine can normally access the data in the volume, the data in the volume needs to be backed up such that the volume management program can recover the data in the volume.

Optionally, the backup storage system is the same as a storage system of the image file, and the backup storage system is configured to store incremental backup data sent by the volume management program.

The full backup data is obtained by backing up (copying) an image file that is stored in a mirror server and that has not been modified. The incremental backup data is obtained by backing up (copying) an added or modified file in comparison with a previous backup after a full backup or a previous incremental backup. For example, the first incremental backup is backing up an added or modified file in comparison with full backup data, the second incremental backup is backing up an added or modified file in comparison with the first time of incremental backup data, the third incremental backup is backing up an added or modified file in comparison with the second time of incremental backup data, and so on.

Optionally, in this application, the image file stored in the mirror server is used as the full backup data, and an incremental backup is performed on the data in the volume. In this way, when backing up data for the first time, the volume management program needs to back up only the data in the volume, and does not need to back up the data in the image file, thereby reducing an amount of data that needs to be backed up when the volume management program performs a backup for the first time.

Optionally, the volume management program performs an incremental backup on the volume once at intervals of preset duration.

The preset duration is set by a developer or a user, and the preset duration may be 24 hours, 12 hours, or the like. A value of the preset duration is not limited in this embodiment.

Figure 10:
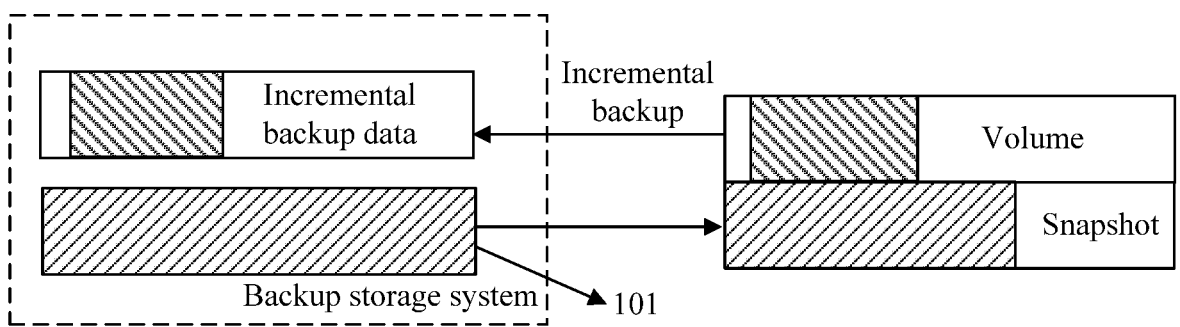
FIG. 10 is a schematic diagram of a data backup according to an example embodiment of this application.

Referring to FIG. 10, a volume management program uses an image file 101 as full backup data (indicated by a shade with left slashes in the figure) and performs an incremental backup on data in a volume to obtain incremental backup data (indicated by a shade with right slashes in the figure), and the image file 101 and the incremental backup data are stored in a backup storage system.

In conclusion, according to the data loading method provided in this embodiment, the data in the volume is used as the incremental backup data, and the image file in the mirror server is used as the full backup data. Because the backup storage system and the image file use a same storage system, only the data in the volume needs to be backed up when a volume management program performs a backup for the first time, thereby reducing an amount of data that needs to be backed up by the volume management program.

Optionally, when performing a backup for the first time, the volume management program may perform a full backup on the data in the snapshot and the volume to obtain full backup data, and subsequently perform an incremental backup only on the data in the volume to obtain incremental backup data. In this case, the image file and the backup storage system may use different storage systems.

It should be additionally noted that, in this application, that a snapshot and a cache volume on which each virtual machine relies load a same image file from a mirror server is used as an example for description. During actual implementation, at least two different snapshots may load different image files from the mirror server, or at least two different cache volumes may load different image files from the mirror server. For a manner in which each snapshot and/or cache volume loads a corresponding image file, refer to the foregoing embodiments, and details are not described in this embodiment.

Figure 11:
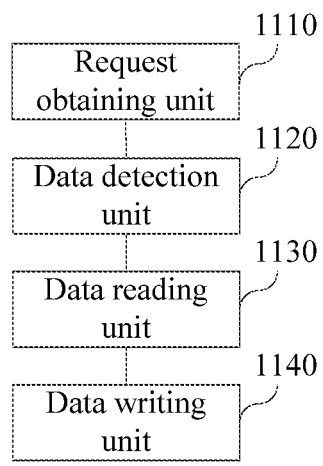
FIG. 11 is a block diagram of a data loading apparatus according to an embodiment of this application.

Referring to FIG. 11, FIG. 11 is a block diagram of a data loading apparatus according to an embodiment of this application. The data loading apparatus may be implemented as all or a part of the cloud host 120 in the data loading system shown in FIG. 1A and FIG. 1B by software, hardware, or a combination thereof. The data loading apparatus may include a request obtaining unit 1110, a data detection unit 1120, a data reading unit 1130, and a data writing unit 1140.

The request obtaining unit 1110 is configured to obtain a data loading request of a virtual machine after a virtual machine is started, where the data loading request is used to request to load target data in an image file.

The data detection unit 1120 is configured to determine whether the target data is stored in a snapshot corresponding to the virtual machine, where the snapshot is obtained based on a blank volume corresponding to the virtual machine when the virtual machine is created, the volume is associated with a corresponding snapshot, the snapshot is used to lazily load the image file, and the snapshot is associated with the image file.

The data reading unit 1130 is configured to write the target data from a mirror server into the snapshot when the target data is not stored in the snapshot, and then read the target data and send the target data to the virtual machine.

The data writing unit 1140 is further configured to obtain virtual machine data generated by the virtual machine, and write the virtual machine data into the volume.

Optionally, the apparatus further includes a background loading unit (not shown) and an attribute switching unit (not shown).

The background loading unit is configured to load data in the image file except the target data to the snapshot.

The attribute switching unit is configured to switch an attribute of the snapshot from a lazy loading attribute to a normal attribute after all data in the image file is loaded to the snapshot.

Optionally, the apparatus further includes a data combination unit.

The data combination unit is configured to combine the data in the snapshot after the data in the image file except the target data is loaded to the snapshot, and store the data into the volume.

Optionally, the data writing unit 1140 is configured to write the target data from the mirror server into a cache volume corresponding to the image file, and write the target data in the cache volume into the snapshot.

Optionally, the data writing unit 1140 is configured to write the target data from the mirror server into the cache volume when the virtual machine is the first virtual machine that requests to load the target data.

Optionally, the data writing unit 1140 is configured to, when the virtual machine is not the first virtual machine that requests to load the target data, and another virtual machine is requesting to write the target data into the cache volume, suspend responding to the data loading request until the target data is written into the cache volume.

Optionally, the cache volume is a snapshot corresponding to an already created virtual machine, and the already created virtual machine includes a virtual machine that sends the data loading request.

The data combination unit is further configured to, when all the data in the image file has been loaded to the cache volume, and all the data in the image file has been loaded to a snapshot corresponding to another virtual machine that uses the image file, combine the data in the cache volume, and store the data into a volume corresponding to the already created virtual machine.

Optionally, the apparatus further includes a backup unit (not shown).

The backup unit is configured to, after the virtual machine data generated by the virtual machine is obtained, and the virtual machine data is written into the volume, send the data stored in the volume to a backup storage system, where the backup storage system is configured to use the data stored in the volume as incremental backup data of the virtual machine, use an image file stored in the mirror server as full backup data of the virtual machine, and perform data recovery for the virtual machine based on the full backup data and the incremental backup data.

For related details, refer to the foregoing method embodiments.

Figure 12:
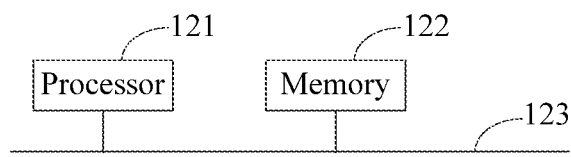
FIG. 12 is a structural diagram of a data loading device according to an embodiment of this application.

Referring to FIG. 12, FIG. 12 is a schematic structural diagram of a data loading device according to an example embodiment of this application. The data loading device may be the cloud host 120 in the data loading system shown in FIG. 1. The data loading device includes a processor 121, a memory 122, and a bus 123.

The processor 121 includes one or more processing cores. The processor 121 executes various function applications and processes information by running a software program and module.

The memory 122 is connected to the processor 121 using the bus 123. A program instruction and data that are necessary for the data loading device in a data loading process are stored in the memory 122.

The processor 121 is configured to execute the program instruction and/or data in the memory 122, to implement the functions of the data loading method provided in each method embodiment in this application.

In addition, the memory 122 may be implemented by any type of volatile or non-volatile storage device, or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

It may be understood that FIG. 12 merely shows a simplified design of the data loading device. In another embodiment, the data loading device may include any quantity of transmitters, receivers, processors, controllers, memories, communications units, and the like, and all data loading devices that can implement the present disclosure shall fall within the protection scope of the present disclosure.

Optionally, this application provides a computer readable storage medium. An instruction is stored in the computer readable storage medium, and when the instruction is run on a data loading device, the data loading device performs the data loading method provided in each of the foregoing method embodiments.

A person of ordinary skill in the art may understand that all or some of the steps of the embodiments may be implemented by hardware or a program instructing related hardware. The program may be stored in a computer-readable storage medium. The storage medium may include a ROM, a magnetic disk, an optical disc, or the like.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A data loading method, comprising:
    obtaining a data loading request of a virtual machine after the virtual machine is started, wherein the data loading request requests to load target data in an image file;
    determining whether the target data is stored in a snapshot corresponding to the virtual machine, wherein the snapshot is obtained based on a blank volume corresponding to the virtual machine when the virtual machine is created, wherein the blank volume is associated with the snapshot, wherein the snapshot loads the image file in a first speed, and wherein the snapshot is associated with the image file;
    writing the target data from a mirror server into the snapshot when the target data is not stored in the snapshot;
    reading the target data;
    sending the target data to the virtual machine;
    obtaining virtual machine data generated by the virtual machine; and
    writing the virtual machine data into the blank volume.

2. The data loading method of claim 1, further comprising:
    loading data in the image file except the target data to the snapshot; and
    switching an attribute of the snapshot from a first speed loading attribute to a second speed loading attribute after all data in the image file is loaded to the snapshot.

3. The data loading method of claim 2, wherein after loading the data in the image file except the target data to the snapshot, the data loading method further comprises:
    combining data in the snapshot; and
    storing combined data into the blank volume.

4. The data loading method of claim 1, wherein writing the target data from the mirror server into the snapshot comprises:
    writing the target data from the mirror server into a cache volume corresponding to the image file; and
    writing the target data in the cache volume into the snapshot.

5. The data loading method of claim 4, wherein writing the target data from the mirror server into the cache volume corresponding to the image file comprises writing the target data from the mirror server into the cache volume when the virtual machine is a first virtual machine requesting to load the target data.

6. The data loading method of claim 4, wherein the virtual machine is not a first virtual machine requesting to load the target data, wherein another virtual machine requests to write the target data into the cache volume, and wherein before writing the target data in the cache volume into the snapshot, the data loading method further comprises suspending responding to the data loading request until the target data is written into the cache volume.

7. The data loading method of claim 4, wherein the cache volume is a snapshot corresponding to an already created virtual machine, wherein the already created virtual machine is a virtual machine sending the data loading request, and wherein after writing the target data from the mirror server into the snapshot, the data loading method further comprises:
    combining data in the cache volume when all data in the image file has been loaded to the cache volume and all the data in the image file has been loaded to a snapshot corresponding to another virtual machine that uses the image file; and
    storing combined data into a volume corresponding to the already created virtual machine.

8. The data loading method of claim 1, wherein after obtaining the virtual machine data generated by the virtual machine, and writing the virtual machine data into the blank volume, the data loading method further comprises sending data stored in the blank volume to a backup storage system to enable the backup storage system to set the data stored in the blank volume as incremental backup data of the virtual machine, set an image file stored in the mirror server as full backup data of the virtual machine, and perform data recovery for the virtual machine based on the full backup data and the incremental backup data.

9. A data loading device, comprising:
a memory configured to store instructions; and
a processor coupled to the memory, wherein the instructions cause causing the processor to be configured to:
obtain a data loading request of a virtual machine after the virtual machine is started, wherein the data loading request requests to load target data in an image file;
determine whether the target data is stored in a snapshot corresponding to the virtual machine, wherein the snapshot is obtained based on a blank volume corresponding to the virtual machine when the virtual machine is created, wherein the blank volume is associated with the snapshot, wherein the snapshot loads the image file in a first speed, and wherein the snapshot is associated with the image file;
write the target data from a mirror server into the snapshot when the target data is not stored in the snapshot;
read the target data;
send the target data to the virtual machine;
obtain virtual machine data generated by the virtual machine; and
write the virtual machine data into the blank volume.

10. The data loading device of claim 9, wherein the instructions further cause the processor to be configured to:
load data in the image file except the target data to the snapshot; and
switch an attribute of the snapshot from a first speed loading attribute to a second speed loading attribute after all data in the image file is loaded to the snapshot.

11. The data loading device of claim 10, wherein after the data in the image file except the target data is loaded to the snapshot, the instructions further cause the processor to be configured to:
combine data in the snapshot; and
store combined data into the blank volume.

12. The data loading device of claim 9, wherein the instructions further cause the processor to be configured to:
write the target data from the mirror server into a cache volume corresponding to the image file; and
write the target data in the cache volume into the snapshot.

13. The data loading device of claim 12, wherein the virtual machine is a first virtual machine requesting to load the target data, and wherein the instructions further cause the processor to be configured to write the target data from the mirror server into the cache volume.

14. The data loading device of claim 12, wherein the virtual machine is not a first virtual machine requesting to load the target data, wherein another virtual machine requests to write the target data into the cache volume, and wherein the instructions further cause the processor to be configured to suspend responding to the data loading request until the target data is written into the cache volume.

15. The data loading device of claim 12, wherein the cache volume is a snapshot corresponding to an already created virtual machine, wherein the already created virtual machine is a virtual machine sending the data loading request, wherein all data in the image file has been loaded to the cache volume, wherein all the data in the image file has been loaded to a snapshot corresponding to another virtual machine that uses the image file, and wherein the instructions further cause the processor to be configured to:
combine data in the cache volume; and
store combined data into a volume corresponding to the already created virtual machine.

16. The data loading device of claim 9, wherein after the virtual machine data generated by the virtual machine is obtained, and the virtual machine data is written into the blank volume, the instructions further cause the processor to be configured to send the virtual machine data stored in the blank volume to a backup storage system to enable the backup storage system to set the virtual machine data stored in the blank volume as incremental backup data of the virtual machine, set an image file stored in the mirror server as full backup data of the virtual machine, and perform data recovery for the virtual machine based on the full backup data and the incremental backup data.

17. A non-transitory computer readable storage medium, wherein an executable program is stored in the non-transitory computer readable storage medium, and wherein the executable program is executed by a processor to:
obtain a data loading request of a virtual machine after the virtual machine is started, wherein the data loading request requests to load target data in an image file;
determine whether the target data is stored in a snapshot corresponding to the virtual machine, wherein the snapshot is obtained based on a blank volume corresponding to the virtual machine when the virtual machine is created, wherein the blank volume is associated with the snapshot, wherein the snapshot loads the image file in a first speed, and wherein the snapshot is associated with the image file;
write the target data from a mirror server into the snapshot when the target data is not stored in the snapshot;
read the target data;
send the target data to the virtual machine;
obtain virtual machine data generated by the virtual machine; and
write the virtual machine data into the blank volume.

18. The non-transitory computer readable storage medium of claim 17, wherein the executable program is further executed by the processor to:
load data in the image file except the target data to the snapshot; and
switch an attribute of the snapshot from a first speed loading attribute to a second speed loading attribute after all data in the image file is loaded to the snapshot.

19. The non-transitory computer readable storage medium of claim 18, wherein the executable program is further executed by the processor to:
combine data in the snapshot; and
store combined data into the blank volume.

20. The non-transitory computer readable storage medium of claim 17, wherein the executable program is further executed by the processor to:
write the target data from the mirror server into a cache volume corresponding to the image file; and
write the target data in the cache volume into the snapshot.

* * * * *

UNITED STATES PATENT AND TRADEMARK OFFICE
CERTIFICATE OF CORRECTION

PATENT NO.       : 10,838,829 B2
APPLICATION NO.  : 16/238093
DATED            : November 17, 2020
INVENTOR(S)      : Mingjun Li Page 1 of 1

It is certified that error appears in the above-identified patent and that said Letters Patent is hereby corrected as shown below:

In the Claims

Claim 9, Column 27, Line 7: "cause causing the processor" should read "cause the processor"

Signed and Sealed this
Fifth Day of January, 2021

Andrei Iancu
*Director of the United States Patent and Trademark Office*